US008538154B2

(12) United States Patent
Komaki

(10) Patent No.: US 8,538,154 B2
(45) Date of Patent: Sep. 17, 2013

(54) IMAGE PROCESSING METHOD AND IMAGE PROCESSING APPARATUS FOR EXTRACTING HEADING REGION FROM IMAGE OF DOCUMENT

(75) Inventor: Yoshio Komaki, Nishinomiya (JP)

(73) Assignee: Konica Minolta Business Technologies, Inc. (JP)

( * ) Notice: Subject to any disclaimer, the term of this patent is extended or adjusted under 35 U.S.C. 154(b) by 396 days.

(21) Appl. No.: 12/889,908

(22) Filed: Sep. 24, 2010

(65) Prior Publication Data
US 2011/0075932 A1    Mar. 31, 2011

(30) Foreign Application Priority Data
Sep. 28, 2009  (JP) ................................. 2009-223031

(51) Int. Cl.
*G06K 9/34*    (2006.01)

(52) U.S. Cl.
USPC ............ 382/175; 382/176; 382/190; 707/736

(58) Field of Classification Search
USPC .......................... 382/175, 176, 190; 707/736
See application file for complete search history.

(56) References Cited

U.S. PATENT DOCUMENTS
6,912,555 B2 *   6/2005   Lemon et al. .................. 715/239
7,233,938 B2 *   6/2007   Carus et al. ....................... 705/2

FOREIGN PATENT DOCUMENTS
JP            11-238096 A      8/1999

* cited by examiner

*Primary Examiner* — Chan S Park
*Assistant Examiner* — Eueng-Nan Yeh
(74) *Attorney, Agent, or Firm* — Cantor Colburn LLP

(57) ABSTRACT

An image processing apparatus analyzes an image of a document to thereby extract a heading region from the image. The image processing apparatus detects candidates for the heading region from the image, and defines a predetermined range in the image as a range to be processed. The apparatus further groups the candidates in the range to be processed, based on a feature quantity corresponding to a feature in terms of style of a character string. The apparatus selects a representative group from the resultant groups, and divides the range to be processed, at the position of a candidate belonging to the representative group. The apparatus newly defines each of the portions generated by the division as a range to be processed.

12 Claims, 23 Drawing Sheets

- 402 HEADER SECTION
- 404 DOCUMENT IMAGE (PAGE 1) ... DOCUMENT IMAGE (PAGE n)
- 406 BOOKMARK DATA
- 408 FOOTER SECTION

| PAGE NUMBER | REGION'S UPPER-LEFT COORDINATES | REGION'S LOWER-RIGHT COORDINATES | TYPE OF ELEMENT |
|---|---|---|---|
| 1 | (50,100) | (60,800) | HEADING |
| ... | ... | ... | ... |
|  |  |  |  |
|  |  |  |  |
|  |  |  |  |

| <R1> | NUMBER OF HEADINGS | LEFT-SIDE STARTING POSITION | HEIGHT OF ROW | MOST UPSTREAM POSITION | CANDIDATE REGION LOCATED UPSTREAM OF ALL TEXTS IS INCLUDED | CANDIDATE REGION WITHOUT FOLLOWED BY TEXT LOCATED DOWNSTREAM IS INCLUDED | TOTAL POINT |
|---|---|---|---|---|---|---|---|
| GROUP 1 | 10 | 50 | 5 | 10* +1 | ○ +5 | — | +6 |
| GROUP 2 | 1 | 10* +1 | 10* +1 | 30 | ○ +5 | — | +7 ⇐ REPRESENTATIVE GROUP |
| GROUP 3 | 3 | 30 | 5 | 50 | ○ +5 | — | +5 |
| GROUP 4 | 2 | 70 | 5 | 150 | — | — | 0 |

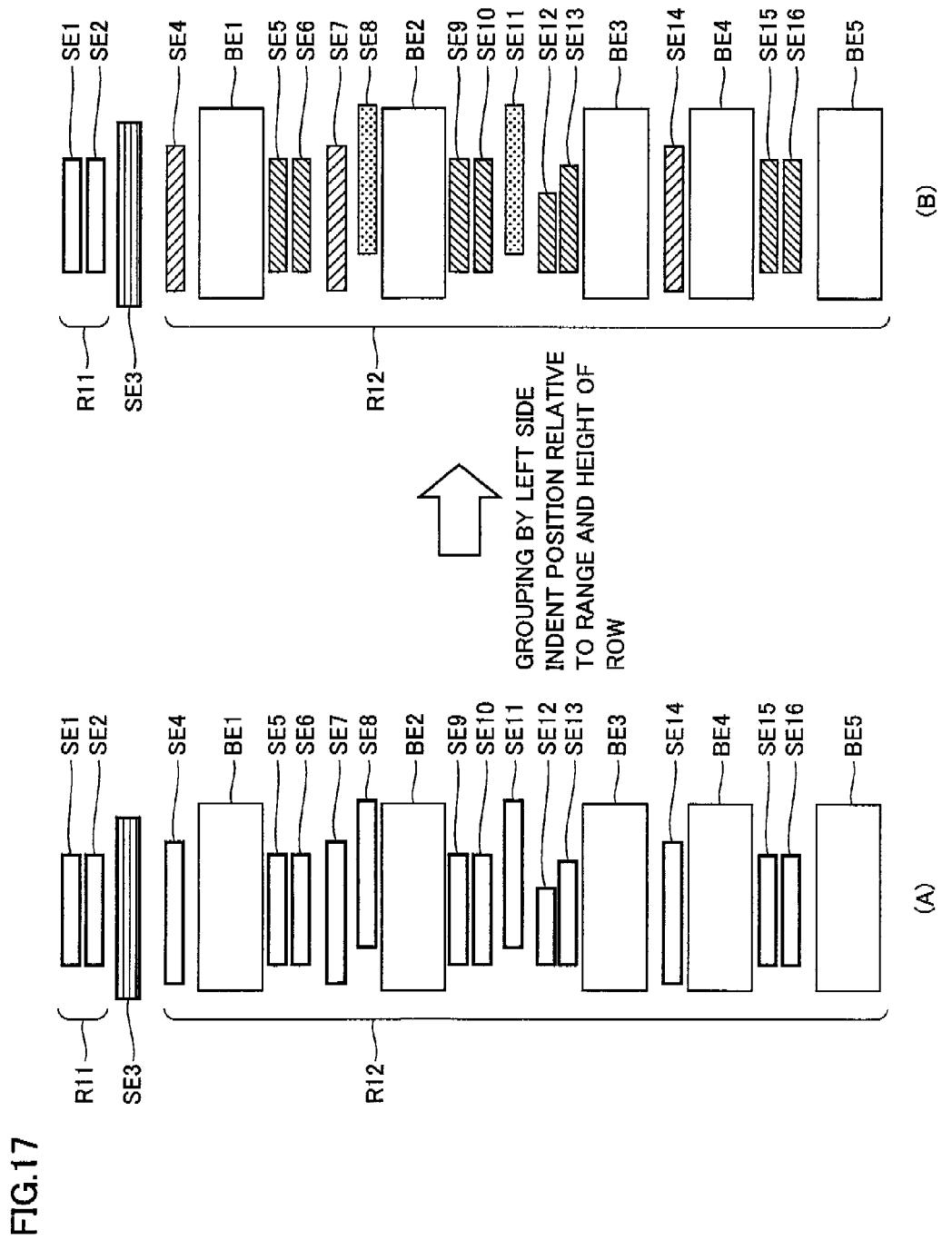

<R11> → END DETERMINATION

| | NUMBER OF HEADINGS | LEFT-SIDE STARTING POSITION | HEIGHT OF ROW | MOST UPSTREAM POSITION | |
|---|---|---|---|---|---|
| GROUP 1_1 | 2 | 50 | 50 | 10 | NO TEXT IN RANGE |

(B)

<R12> ⇐ REPRESENTATIVE GROUP

| | NUMBER OF HEADINGS | LEFT-SIDE STARTING POSITION | HEIGHT OF ROW | MOST UPSTREAM POSITION | CANDIDATE REGION LOCATED UPSTREAM OF ALL TEXTS IS INCLUDED | CANDIDATE REGION WITHOUT FOLLOWED BY TEXT LOCATED DOWNSTREAM IS INCLUDED | TOTAL POINT |
|---|---|---|---|---|---|---|---|
| GROUP 1_2 | 8 | 50 | 5 | 100 | – | – | 0 |
| GROUP 3 | 3 | 30* +1 | 5 | 50* +1 | ○ +5 | – | +7 |
| GROUP 4 | 2 | 70 | 5 | 150 | – | – | 0 |

<R21> → EXCLUDE

| <R21> | NUMBER OF HEADINGS | LEFT-SIDE STARTING POSITION | HEIGHT OF ROW | MOST UPSTREAM POSITION | CANDIDATE REGION LOCATED UPSTREAM OF ALL TEXTS IS INCLUDED | CANDIDATE REGION WITHOUT FOLLOWED BY TEXT LOCATED DOWNSTREAM IS INCLUDED | TOTAL POINT |
|---|---|---|---|---|---|---|---|
| GROUP 1_2_1 | 2 | 50 +1 | 5 +1 | 100 +1 | — | O −10 | −7 |

(B)

<R22> ⇐ REPRESENTATIVE GROUP

| <R22> | NUMBER OF HEADINGS | LEFT-SIDE STARTING POSITION | HEIGHT OF ROW | MOST UPSTREAM POSITION | CANDIDATE REGION LOCATED UPSTREAM OF ALL TEXTS IS INCLUDED | CANDIDATE REGION WITHOUT FOLLOWED BY TEXT LOCATED DOWNSTREAM IS INCLUDED | TOTAL POINT |
|---|---|---|---|---|---|---|---|
| GROUP 1_2_2 | 4 | 50* +1 | 5 | 200 | — | — | +1 |
| GROUP 4 | 2 | 70 | 5 | 150 +1* | O +5 | — | +6 |

(C)

<R23> → EXCLUDE

| <R23> | NUMBER OF HEADINGS | LEFT-SIDE STARTING POSITION | HEIGHT OF ROW | MOST UPSTREAM POSITION | CANDIDATE REGION LOCATED UPSTREAM OF ALL TEXTS IS INCLUDED | CANDIDATE REGION WITHOUT FOLLOWED BY TEXT LOCATED DOWNSTREAM IS INCLUDED | TOTAL POINT |
|---|---|---|---|---|---|---|---|
| GROUP 1_2_3 | 2 | 50 +1 | 5 +1 | 300 +1 | — | — | +3 |

| <R31> | NUMBER OF HEADINGS | LEFT-SIDE STARTING POSITION | HEIGHT OF ROW | MOST UPSTREAM POSITION | CANDIDATE REGION LOCATED UPSTREAM OF ALL TEXTS IS INCLUDED | CANDIDATE REGION WITHOUT FOLLOWED BY TEXT LOCATED DOWNSTREAM IS INCLUDED | TOTAL POINT |
|---|---|---|---|---|---|---|---|
| GROUP 1_2_3_1 | 2 | 50 +1 | 5 +1 | 200 +1 | — | ○ −10 | −7 |

⇒ EXCLUDE (B)

| <R32> | NUMBER OF HEADINGS | LEFT-SIDE STARTING POSITION | HEIGHT OF ROW | MOST UPSTREAM POSITION | CANDIDATE REGION LOCATED UPSTREAM OF ALL TEXTS IS INCLUDED | CANDIDATE REGION WITHOUT FOLLOWED BY TEXT LOCATED DOWNSTREAM IS INCLUDED | TOTAL POINT |
|---|---|---|---|---|---|---|---|
| GROUP 1_2_3_2 | 2 | 50 +1 | 5 +1 | 250 +1 | ○ +5 | — | +8 |

⇐ REPRESENTATIVE GROUP

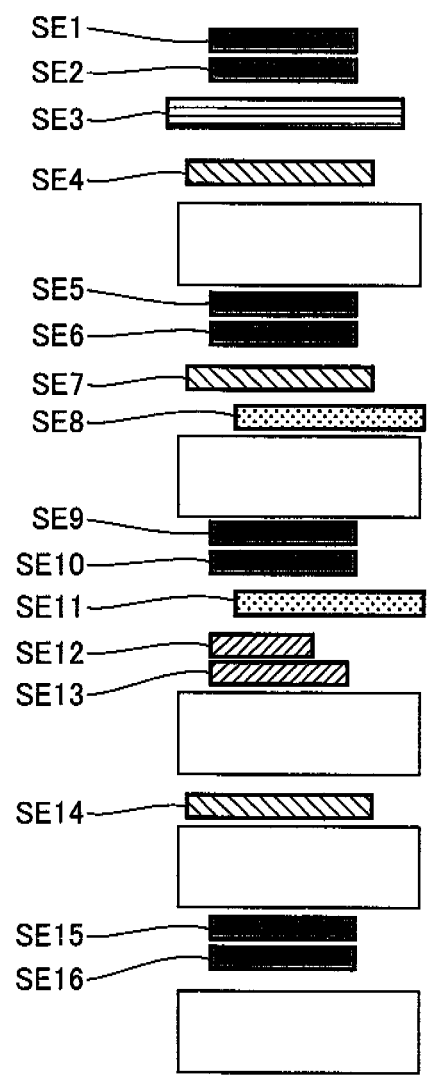

FIG.25

| CHARACTER STRING ELEMENT REGION(SE) | LEFT-SIDE STARTING POSITION | HEIGHT OF ROW | GROUP |
|---|---|---|---|
| 1 | 50 | 5 | 1 |
| 2 | 50 | 5 | 1 |
| 3 | 10 | 10 | 2 |
| 4 | 30 | 5 | 3 |
| 5 | 50 | 5 | 1 |
| 6 | 50 | 5 | 1 |
| 7 | 30 | 5 | 3 |
| 8 | 70 | 5 | 4 |
| 9 | 50 | 5 | 1 |
| 10 | 50 | 5 | 1 |
| 11 | 70 | 5 | 4 |
| 12 | 50 | 5 | 1 |
| 13 | 50 | 5 | 1 |
| 14 | 30 | 5 | 3 |
| 15 | 50 | 5 | 1 |
| 16 | 50 | 5 | 1 |

IMAGE PROCESSING METHOD AND IMAGE PROCESSING APPARATUS FOR EXTRACTING HEADING REGION FROM IMAGE OF DOCUMENT

This application is based on Japanese Patent Application No. 2009-223031 filed with the Japan Patent Office on Sep. 28, 2009, the entire content of which is hereby incorporated by reference.

BACKGROUND OF THE INVENTION

1. Field of the Invention

The present invention relates to an image processing method and an image processing apparatus, and particularly to an image processing method and an image processing apparatus for extracting a heading region from an image of a document.

2. Description of the Related Art

There has conventionally been a method of extracting, from character string element regions in the whole image of a document, headings (title heading, section heading) by means of a common extraction rule that is based on a feature quantity.

For example, Document 1 (Japanese Laid-Open Patent Publication No. 11-238096) describes extraction of listed elements (corresponding to headings) from all rows on the row-by-row basis that are included in an image of a document, based on a specific feature quantity.

The technique of Document 1, however, is applied to all rows included in a document for extracting headings by means of a specific feature quantity from the whole document defined as one range. A resultant problem has therefore been that the style of a document from which headings can be appropriately extracted is significantly restricted.

In other words, in the case of a document style including background characters and repeatedly appearing small character string elements (such as itemized elements, header and footer added to a page or slide to be displayed), heading regions cannot be appropriately extracted if the same rule is applied to the whole document without exception.

Conventionally, in order to appropriately extract headings of a plurality of different levels from a document of such a style, it is necessary to add a process of extracting a feature quantity and to sophisticate the rule. The addition of a feature quantity extraction process and the sophistication of the rule, however, add the cost and increase the processing time, and thus fail in practice.

SUMMARY OF THE INVENTION

The present invention has been made to solve the problems as described above, and an object of the invention is to provide an image processing method and an image processing apparatus with which a heading region can appropriately be extracted even from a document of a style including background characters and/or repeatedly appearing small character string elements.

According to the present invention, an image processing method is performed by an image processing apparatus for extracting a heading region from an image of a document, and includes the steps of storing the image by the image processing apparatus, and analyzing the image by the image processing apparatus. The step of analyzing the image includes the steps of: detecting candidates for the heading region, from a plurality of character string element regions in the image; defining a range including a plurality of the character string element regions as a range to be processed; grouping into groups the candidates within the range to be processed, based on a feature quantity corresponding to a feature in terms of style of a character string; detecting, for each of the groups included in the range to be processed, to what extent each group includes a characteristic of the heading region; selecting, from the groups included in the range to be processed, a group based on the extent, as a representative group; determining that the candidate belonging to the representative group is the heading region; dividing the range to be processed, at a position of the heading region; and newly defining each of portions generated by dividing the range to be processed, as the range to be processed.

According to the present invention, a computer-readable non-transitory medium is encoded with a computer program for executing the image processing method as described above.

According to the present invention, an image processing apparatus for extracting a heading region from an image of a document includes a storage unit for storing the image, and an analysis unit for analyzing the image. The analysis unit detects candidates for the heading region, from a plurality of character string element regions in the image; defines a range including a plurality of the character string element regions as a range to be processed; groups into groups the candidates within the range to be processed, based on a feature quantity corresponding to a feature in terms of style of a character string; detects, for each of the groups included in the range to be processed, to what extent each group includes a characteristic of the heading region; selects, from the groups included in the range to be processed, a group based on the extent, as a representative group; determines that the candidate belonging to the representative group is the heading region; divides a portion other than the candidate belonging to the representative group in the defined range, at a position of the candidate belonging to the representative group; and newly defines each of portions other than the candidate belonging to the representative group that are generated by dividing the portion, as the range to be processed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 16 is a table illustrating the result of determination about heading that is made for groups in a range shown by (A) of FIG. 15.

FIG. 17 is a diagram illustrating the result of grouping of heading candidates in each of ranges generated by dividing the range shown by (A) of FIG. 15.

FIG. 18 is a table illustrating the result of determination about heading that is made for groups in ranges shown by (A) of FIG. 17.

FIG. 20 is a table illustrating the result of determination about heading that is made for groups in ranges shown in FIG. 19.

FIG. 22 is a table illustrating the result of determination about heading made for groups in ranges shown in FIG. 21.

FIG. 23 is a diagram schematically illustrating the result of the heading extraction process in the embodiment of the present invention.

FIG. 25 is a diagram for illustrating a comparative example of the heading extraction process in the embodiment of the present invention.

DESCRIPTION OF THE PREFERRED EMBODIMENTS

Figure 1:
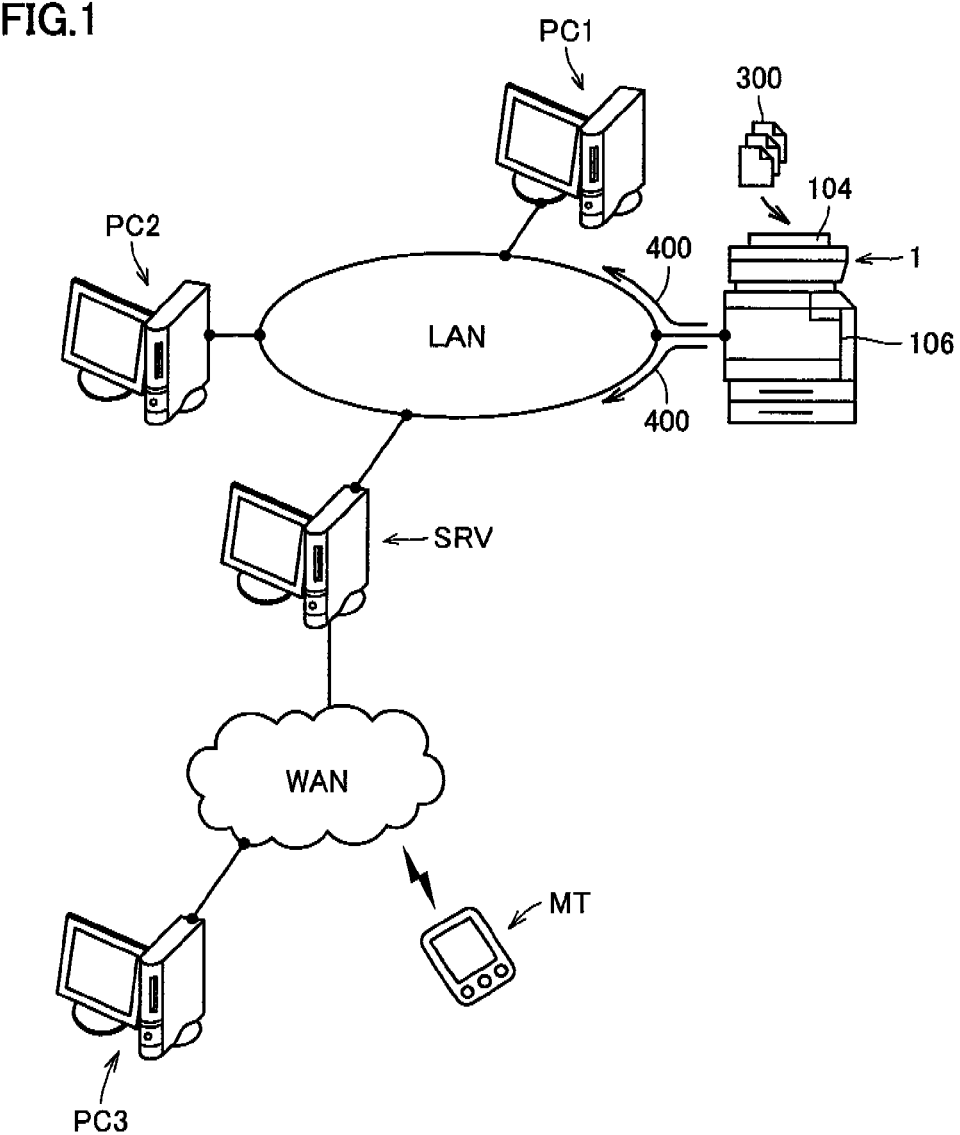
FIG. 1 is a schematic configuration diagram of a system including an image processing apparatus according to an embodiment of the present invention.

An embodiment of the present invention will be described in detail with reference to the drawings. In the drawings, the same or corresponding components are denoted by the same reference characters, and a description thereof will not be repeated.

In the present embodiment, an image processing apparatus defines ranges (step by step) to which a heading extraction rule is applied for extracting a heading from heading candidates in a document image. For the defined ranges each, a heading extraction rule is applied to thereby appropriately extract a heading region from a document image having a variety of document styles including headings of multiple levels.

The image processing apparatus in the present embodiment will hereinafter be described in detail.

As to Configuration

Entire System Configuration

In connection with the present embodiment, an MFP (Multi Function Peripheral) will exemplarily be described as a form of the image processing apparatus of the present invention. It should be noted that the image processing apparatus of the present invention is not limited to the MFP, and is applicable as well to a copier, a facsimile apparatus, a scanner apparatus, and the like.

Referring to FIG. 1, an MFP 1 according to the present embodiment includes an image reader unit 104 for reading an original 300, and a printer unit 106 for performing a printing process on a paper medium and the like.

Especially, MFP 1 according to the present embodiment obtains a document image by reading original 300 with image reader unit 104, and generates an electronic document 400 containing this document image. Typically, a format such as PDF (Portable Document Format) can be used for electronic document 400. Here, MFP 1 extracts at least one heading region from the document image, and generates viewing navigation information for identifying the position where the extracted heading region is located in the document image.

"Viewing navigation information" refers to information for assisting a user in viewing a document image contained in an electronic document, and more specifically to information for identifying the position where a heading region or the like contained in the document image is located. By way of example, such viewing navigation information includes "bookmark", "annotation", "thread", "link" and the like, and may also include a thumbnail (size-reduced image) or the like of a corresponding heading region, in addition to the information for identifying the position of the heading region. In connection with the present embodiment, a description will be given of a configuration using "bookmark" as a representative example of "viewing navigation information".

MFP 1 stores generated electronic document 400 in its storage unit (not shown), and also transmits the electronic document to personal computers PC1, PC2, and PC3 (also referred to collectively as "personal computer PC" hereinafter) and a mobile terminal MT through a network. In an exemplary form of use, MFP 1 directly transmits electronic document 400 to personal computers PC1 and PC2 connected to a LAN (Local Area Network) that is a network installed in the same office in which MFP 1 is installed. A server apparatus SRV is provided at a point where the LAN and a WAN (Wide Area Network) are connected, and electronic document 400 is transmitted through server apparatus SRV from MFP 1 to personal computer PC3 and the like in an office located away from MFP 1. Furthermore, electronic document 400 is transmitted from MFP 1 to mobile terminal MT through a wireless network such as the WAN, public mobile telephone network and wireless LAN (not shown). Here, server apparatus SRV exemplarily includes mail server, FTP (File Transfer Protocol) server, Web server, SMB server, and the like.

Image reader unit 104 includes a set tray for setting an original thereon, a platen glass, a conveyer unit automatically conveying the original set on the set tray to the platen glass one by one, and a discharge tray for discharging the read original (all are not shown). Thus, a plurality of originals can be successively read to generate one electronic document 400.

Schematic Configuration of MFP

Figure 2:
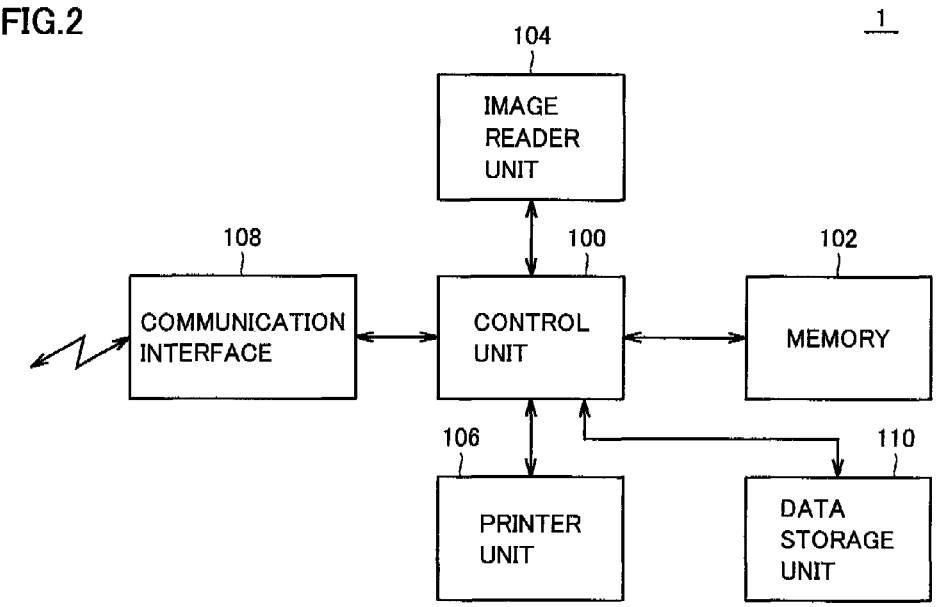
FIG. 2 is a block diagram showing a schematic configuration of the image processing apparatus according to the embodiment of the present invention.

Referring to FIG. 2, MFP 1 includes a control unit 100, a memory 102, image reader unit 104, printer unit 106, a communication interface 108, and a data storage unit 110.

Control unit 100 is exemplarily configured as a processing device such as CPU (Central Processing Unit), and executes a program to thereby implement document image processing according to the present embodiment. Memory 102 is exemplarily a volatile memory device such as DRAM (Dynamic Random Access Memory), and stores for example a program to be executed by control unit 100 and data required to execute the program. Communication interface 108 is exemplarily a component for transmitting and receiving data to and from personal computer PC (FIG. 1) and mobile terminal MT through a network (LAN shown in FIG. 1 for example), and includes a LAN adaptor and driver software for controlling the LAN adaptor. Printer unit 106 is a component for performing a printing process, and includes a control device for controlling operation of each component in addition to a hardware configuration for the printing process. Data storage unit 110 is exemplarily a hard disk device or a nonvolatile memory device such as flash memory, and stores electronic document 400 and the like generated by control unit 100.

Configuration of Personal Computer

Figure 3:
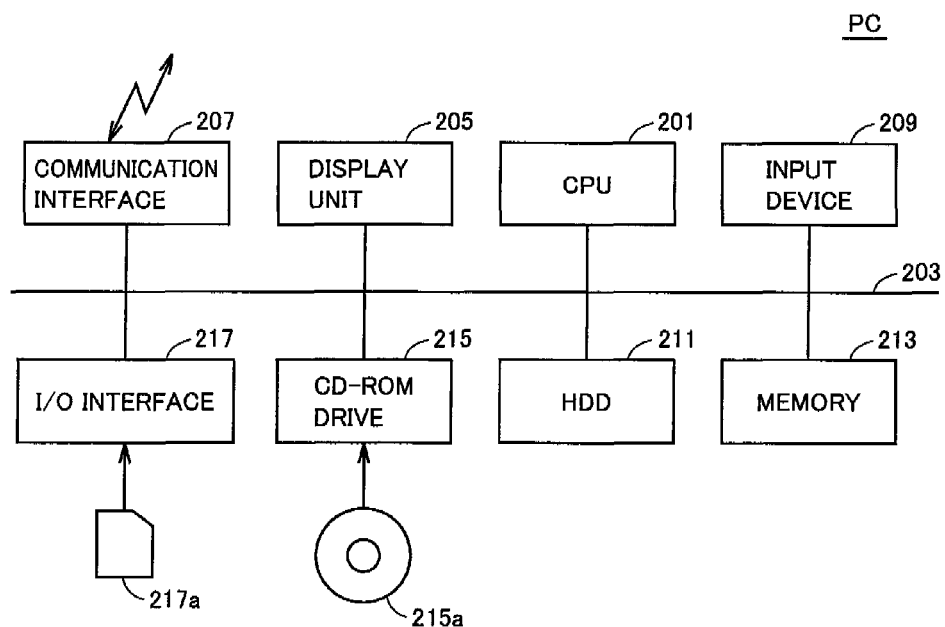
FIG. 3 is a block diagram showing a schematic configuration of a personal computer included in the system shown in FIG. 1.

Referring to FIG. 3, personal computer PC includes a CPU (Central Processing Unit) 201 executing various kinds of programs including an operating system (OS), a memory 213 temporarily storing data required to execute a program by CPU 201, and a hard disk drive (HDD) 211 storing a program to be executed by CPU 201 in a nonvolatile manner. In addition, hard disk drive 211 stores a viewing application for displaying an electronic document generated by MFP 1, and such a program is read from a memory card (SD card for example) 217a or a CD-ROM (Compact Disk-Read Only Memory) 215a by an input/output interface 217 or a CD-ROM drive 215, or the like.

CPU 201 receives an instruction from a user through an input device 209 such as keyboard and mouse, and outputs a screen output generated through execution of a program to a display unit 205. CPU 201 also obtains an electronic document from MFP 1 and server SRV (FIG. 1) connected to the LAN and the WAN through a communication interface 207 including a LAN card or the like, and stores the electronic document in hard disk drive 211 or the like. Further, the above components exchange data with each other through an internal bus 203.

Here, since mobile terminal MT is substantially equivalent to the one shown in FIG. 3 from which CD-ROM drive 215 for example is removed, the detailed description will not be repeated.

Functional Configuration of MFP

Figure 4:
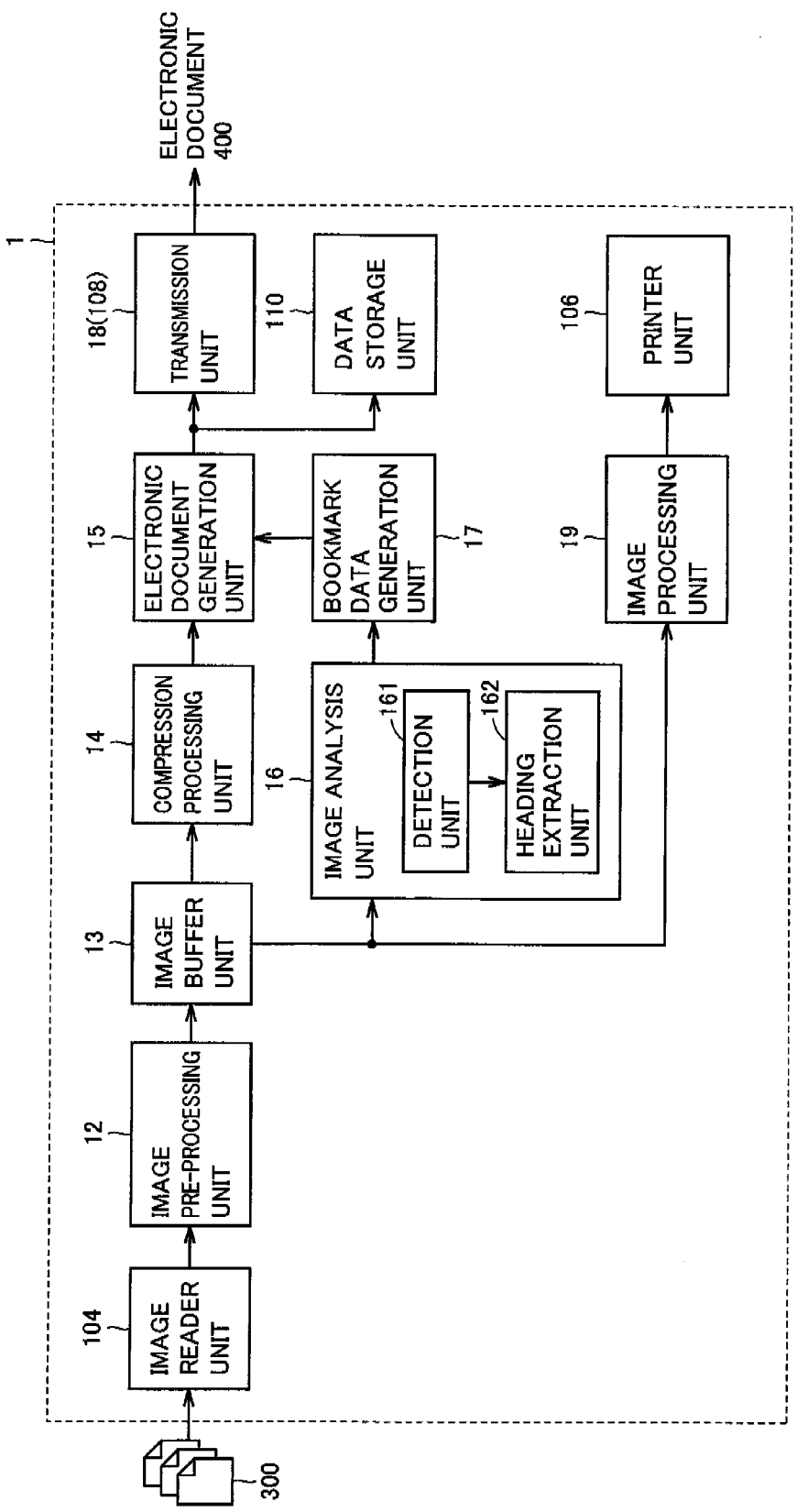
FIG. 4 is a block diagram showing a functional configuration of the image processing apparatus according to the embodiment of the present invention.

Referring to FIG. 4, a functional configuration of MFP 1 includes image reader unit 104, an image pre-processing unit 12, an image buffer unit 13, a compression processing unit 14, an electronic document generation unit 15, an image analysis unit 16, a bookmark data generation unit 17, a transmission unit 18, an image processing unit 19, and printer unit 106. The functions of MFP 1 are mainly implemented by control unit 100 and memory 102 (FIG. 2) for example of MFP 1.

Image reader unit 104 obtains a document image by reading original 300, and outputs the document image to image pre-processing unit 12. Image pre-processing unit 12 adjusts display characteristics and the like of the document image mainly for making them suitable for display on personal computer PC and the like. Furthermore, image pre-processing unit 12 may remove noise contained in the document image. Then, the document image having undergone image processing by image pre-processing unit 12 is transmitted to image buffer unit 13.

Image buffer unit 13 is a component temporarily storing the data of the obtained document image, and outputs the temporarily stored document image to compression processing unit 14, image analysis unit 16, and image processing unit 19.

Compression processing unit 14 compresses the document image that is output from image buffer unit 13, and outputs the resultant document image to electronic document generation unit 15. The degree of compression by this compression processing may be changed depending on the size of an electronic document to be generated and a required resolution of the document image for example. Further, the compression processing may be irreversible conversion such as JPEG (Joint Photographic Experts Group). In addition, where a high resolution is required for example, the compression processing may not be performed.

Image analysis unit 16 analyzes the document image that is output from image buffer unit 13, and extracts a heading region. Image analysis unit 16 includes a detection unit 161 and a heading extraction unit 162 as its functions.

Detection unit 161 divides the document image into a plurality of character string element regions, and detects heading candidates among the plurality of character string element regions. In the present embodiment, a plurality of character string element regions are classified into a small region and a large region, and a small region is detected as a heading candidate, and a large region is detected as text. The classification into a small region and a large region is based on, for example, the size of a region (such as the number of rows, the area, the number of characters), and whether or not the region contains specific characters (such as characters less frequently used for a heading, period, and other punctuation marks).

In the present embodiment, "character string element regions" refer to regions each surrounding one or a series of rows and distinguished from other regions by the preceding and following spaces and/or punctuation marks, and correspond to paragraph (text), heading, and header and footer regions. A specific example of how to define the character string element regions will be described hereinafter.

Heading extraction unit 162 extracts heading regions from the heading candidates detected by detection unit 161. For this purpose, heading extraction unit 162 performs the following process.

For detected heading candidates, heading extraction unit 162 defines a range (step by step) to which a heading extraction rule is applied. Heading candidates (small regions) within the defined range are grouped based on a feature quantity representing a predetermined style type.

"Style type" refers to an item for identifying a feature in terms of the style of a character string, and includes the amount of indent, the height of a row, the color of characters, the background color, the central position of a region, justification, the line width of characters, respective distances from the preceding character string element region and the following character string element region, character string modifications (underline, border), the character size, the character spacing, font, character modifications (bold, italic), and the like. In the present embodiment, it is desirable to determine in advance a style type that is effective in distinguishing logical elements from each other, as a style type to be used for grouping heading candidates. Specifically, for example, "amount of indent (left-side starting position)" and "height of a row" are used as style types. A region having respective feature quantities of these style types (namely the value indicating the left-side starting position and the value indicating the height of a row) and a region having feature quantities similar to the aforementioned feature quantities are identified as belonging to the same group. For example, regions having a distribution of the feature quantity (value) of the left-side starting position and a distribution of the feature quantity (value) of the height of a row that fall within respective predetermined ranges are identified as belonging to the same group.

Heading extraction unit 162 detects group characteristics group by group, applies a predetermined heading extraction rule (described hereinafter) to the results of detection of the group characteristics, and thereby selects (detects) a group representing the range (hereinafter "representative group"). The representative group is a group of heading candidates having characteristics (features) that are most like those of a heading, in the defined range.

"Group characteristics" refer to information about likelihood/unlikelihood that a candidate is a heading, namely information that is effective in determining whether a heading candidate belonging to a group is a heading representing a range. The group characteristics include the above-described feature quantities of the style types used for grouping candidates, namely i) "left-side starting position" and ii) "height of a row", and further include, as features that depend on a defined range, at least one of the uppermost position of a heading candidate in the defined range, and the relation in terms of the order between a heading candidate and a text (large region) in the defined range. Specifically, as the former feature, iii) "position of the most upstream heading candidate within a group" is used. As the latter feature, iv) "whether a heading candidate located upstream of all text regions in the range is included" and v) "whether a heading candidate without being followed by a text located downstream in the range is included" are used.

It is desirable that heading extraction unit 162 excludes, from the representative group, a group that does not satisfy a predetermined criterion when a heading extraction rule is applied to the results of detection of the group characteristics (less than a predetermined threshold for example). Such a process can be added to avoid erroneous determination about the heading.

Heading extraction unit 162 determines that a heading candidate included in the representative group is a heading region. It may be determined that a heading candidate belonging to the group excluded from the representative group is a non-heading-candidate. Namely, it may be determined that a heading candidate within a range including only the group excluded from the representative group is not a heading.

Heading extraction unit 162 divides the original range based on the position of the heading candidate included in the representative group. Specifically, the defined range is divided at a position before or after the heading candidate belonging to the representative group. Among ranges generated by dividing the original range, only a range(s) including a heading candidate for which the determination about whether the heading candidate is a heading or not has not been made is a newly defined range(s).

Heading extraction unit 162 performs again the process similar to the above-described one on the ranges generated by the division, Thus, the process from the grouping of heading candidates to the division of the range is repeated until there is no range that can be defined.

In this way, the results of detection of group characteristics that depend on the defined range is used to select the representative group that is most likely to be a heading. Heading regions can therefore be extracted appropriately from a document image having a variety of document styles including headings of multiple levels.

Heading extraction unit 162 outputs information about the heading candidates identified as heading regions (such as positional information) to bookmark data generation unit 17.

Bookmark data generation unit 17 generates bookmark data based on the information about the heading regions that is output from image analysis unit 16. Bookmark data generation unit 17 may also include, in the bookmark data, information about a specific logical element (such as figure, table, and caption) other than the heading. Bookmark data generation unit 17 outputs the generated bookmark data to electronic document generation unit 15.

Electronic document generation unit 15 generates an electronic document by adding the bookmark data from bookmark data generation unit 17 to the document image compressed by compression processing unit 14. Then, the generated electronic document is stored in data storage unit 110 or output to transmission unit 18, depending on for example the setting by a user. Transmission unit 18 is implemented by communication interface 108, and transmits the electronic document generated by electronic document generation unit 15 to personal computer PC (FIG. 1) for example through the network such as LAN.

Meanwhile, image processing unit 19 converts the document image that is output from image buffer unit 13 into an image suitable for the printing operation by printer unit 106, in accordance with a user's operation. In an exemplary case, a document image defined by the RGB display system is converted into image data of the CMYK display system or the like suitable for color printing. At this time, the color may be adjusted based on the characteristics of printer unit 106. Printer unit 106 performs a printing process on a paper medium or the like based on the image data that is output from image processing unit 19.

It should be noted that the operation of each functional block may be implemented by execution of software stored in memory 102, or at least one of functional blocks may be implemented by hardware.

Example of Data Structure of Electronic Document

Figures 5, 6:
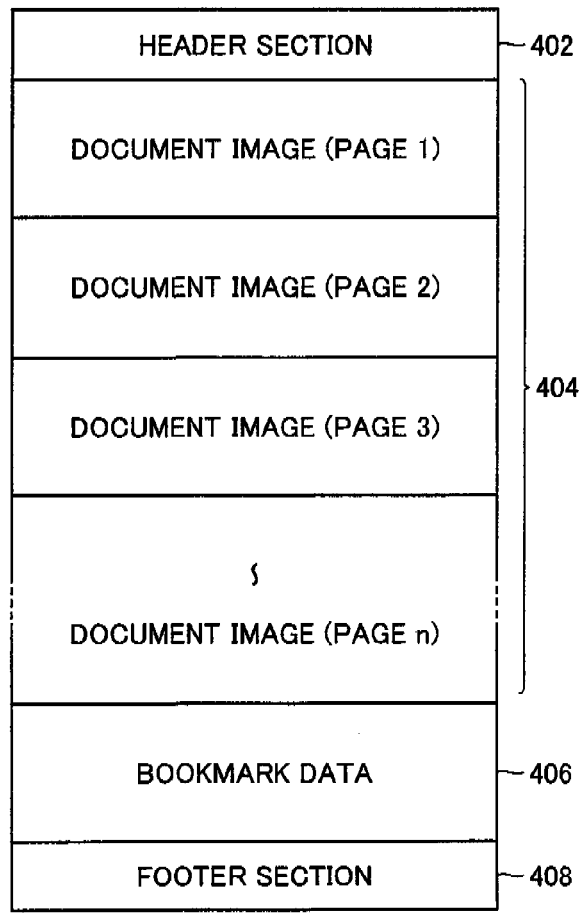
FIG. 5 is a diagram showing an example of a data structure of an electronic document generated by the image processing apparatus according to the embodiment of the present invention.
FIG. 6 is a diagram showing an example of a data structure of bookmark data included in the electronic document in the embodiment of the present invention.

Referring to FIG. 5, electronic document 400 includes a header section 402, a document image section 404, a bookmark data section 406, and a footer section 408. Header section 402 and footer section 408 store information about attributes of electronic document 400 such as date and time of creation, creator, and copyright information. Document image section 404 stores a document image corresponding to each page. This document image may be stored in the compressed state as described above. Bookmark data section 406 stores the bookmark data for specifying a heading region included in the document image, that is, a character string element region (small region) identified as a heading.

Referring to FIG. 6, the bookmark data stores, in association with each heading region, the page number, the region's upper left coordinates, the region's lower right coordinates, and the type of the element, for example. The page number is positional information for specifying a page where the associated heading region is present. The region's upper left coordinates and the region's lower right coordinates are positional information for specifying the position (rectangle) of the associated heading region in the page. The type of the element is information for specifying the type of the associated heading region. It should be noted that the bookmark data may further include positional information about a document element (region) of a type other than the heading.

As to Operation

The process executed by image analysis unit 16 (hereinafter referred to as "image analysis process") is the most characteristic process among the processes executed by MFP 1. Therefore, details of the image analysis process will hereinafter be described.

Referring to a flowchart shown in FIG. 7, a description will be given of the image analysis process in this embodiment of the present invention. The process shown in the flowchart of FIG. 7 is stored as a program in advance in memory 102, and control unit 100 reads and executes this program and thereby the function of the image analysis process is implemented.

Figure 7:
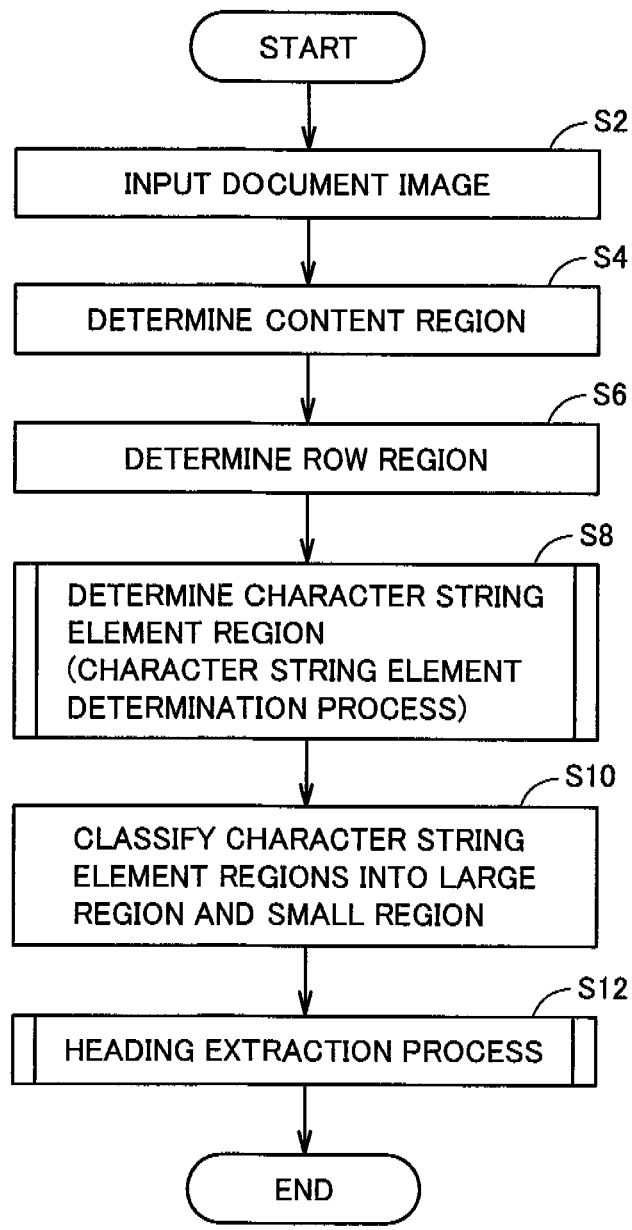
FIG. 7 is a flowchart illustrating an image analysis process in the embodiment of the present invention.

Referring to FIG. 7, image analysis unit 16 inputs data of a document image (step S2). The input data of the document image is stored on an internal memory page by page.

Then, the data of each page on the internal memory is read and a content region is determined (step S4). The content region is a partial region of each page and each content region includes characters of one paragraph.

"Content region" refers to a region corresponding to one paragraph on a page, and is set at the same position with respect to each page. The content region can be determined by any of various existing methods.

For example, a projection histogram in the vertical direction is generated for a density image of a page, and lateral positions of the content region are obtained from the position having the lower total density. Similarly, a projection histogram in the lateral direction is generated, and vertical start and end positions of the content region are obtained.

Then, image analysis unit 16 determines a row region (step S6). The row region can be determined by any of various existing methods. For example, a projection histogram in the lateral direction is generated for the density image of the content region, and the positions of upper and lower ends of each row region are determined from the position having the lower total density.

Subsequently, image analysis unit 16 determines a character string element region (character string element determination process) (step S8). The character string element region is generated by integrating row regions. Image analysis unit 16 controls the integration using the size of the rightmost space of each row region and the type of the last character of the row.

Referring to a flowchart of FIG. 8, a description will be given of the character string element determination process in this embodiment of the present invention.

Figure 8:
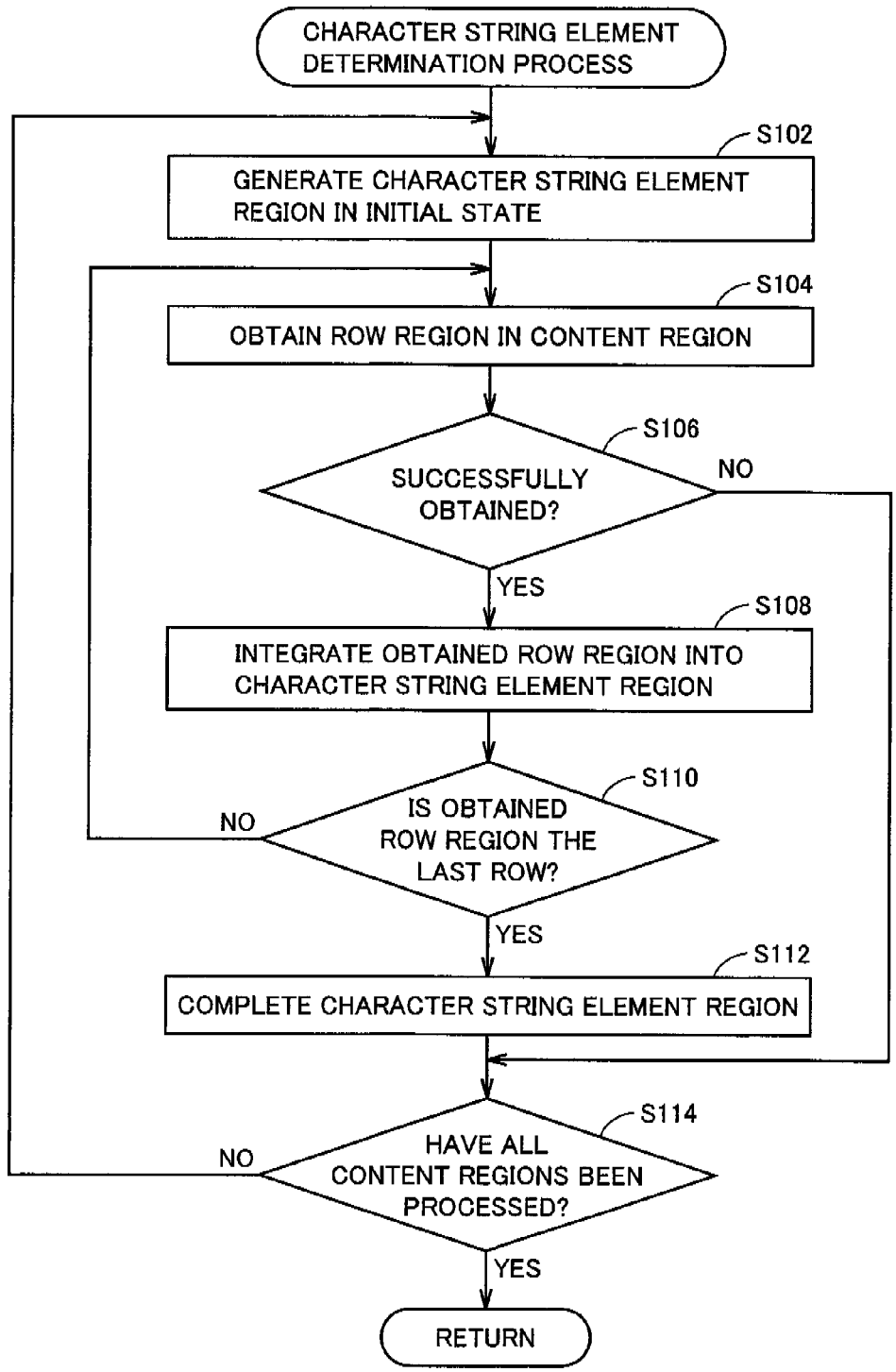
FIG. 8 is a flowchart illustrating a character string element determination process in the embodiment of the present invention.

With reference to FIG. 8, one character string element region in an initial state is generated first (step S102). Then, one unprocessed row region is obtained, following the order of reading (step S104). More specifically, the row region located uppermost in the leftmost content region on the page of the smallest page number is obtained.

Here, it is determined whether or not the row region has been successfully obtained in step S104 (step S106). When there is no unprocessed row region, it is determined that the row region has not been obtained successfully (NO in step S106), and the process proceeds to step S114.

In contrast, when the row region has been obtained successfully (YES in step S106), the obtained row region is integrated into the character string element region (step S108).

Next, image analysis unit 16 determines whether or not the obtained row region is the last row (step S110). More specifically, it is determined whether the rightmost space of the obtained row region is of a predetermined value or more, or whether the type of the last character of the row is a period. The predetermined value of the rightmost space is set for example to the height of characters included in the row region. When it is determined that the obtained row region is the last row (YES in step S110), the process proceeds to step S112. Otherwise (NO in step S110), the process returns to step S104, and the above steps are repeated.

In step S112, image analysis unit 16 completes the character string element region. After this step, the process proceeds to step S114.

In step S114, it is determined whether or not all content regions have been processed. When there is an unprocessed content region (NO in step S114), the process returns to step S102. When there is no unprocessed content region (YES in step S114), the character string element determination process is completed.

Figure 9:
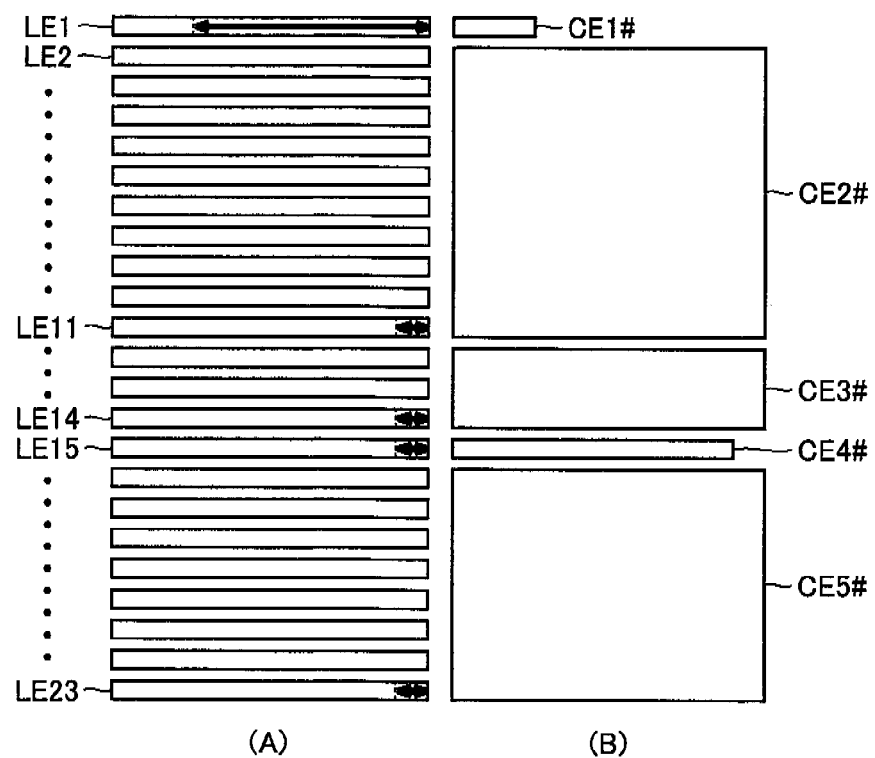
FIG. 9 is a diagram showing an example of character string element regions.

Referring to FIG. 9, an example of the character string element region will be described.

It is supposed that (A) of FIG. 9 shows a part of row regions determined in step S6 of FIG. 7. (B) of FIG. 9 shows the result of the determination of character string element regions performed on the row regions shown by (A) of FIG. 9.

It is determined in step S110 that row regions LE1, LE11, LE14, LE15, and LE23, each have a rightmost space. Row regions LE1 and LE15 thus form respective character string element regions CE1# and CE4# by themselves. Row regions LE2 to LE11, LE12 to LE14, and LE16 to LE23 are integrated in the vertical direction to generate character string element regions CE2#, CE3#, and CE5#, respectively.

It should be noted that, in the case where a character string element region has a rightmost space, the region except for the rightmost space is set as a character string element region.

In the present embodiment, the character string element regions are defined by the above-described method. The method is not limited to the particular one, and the character string element regions may be defined by a known method.

A process executed by image analysis unit 16 after the character string element regions are defined will be described using an exemplary sample document shown in FIG. 10.

Figure 10:
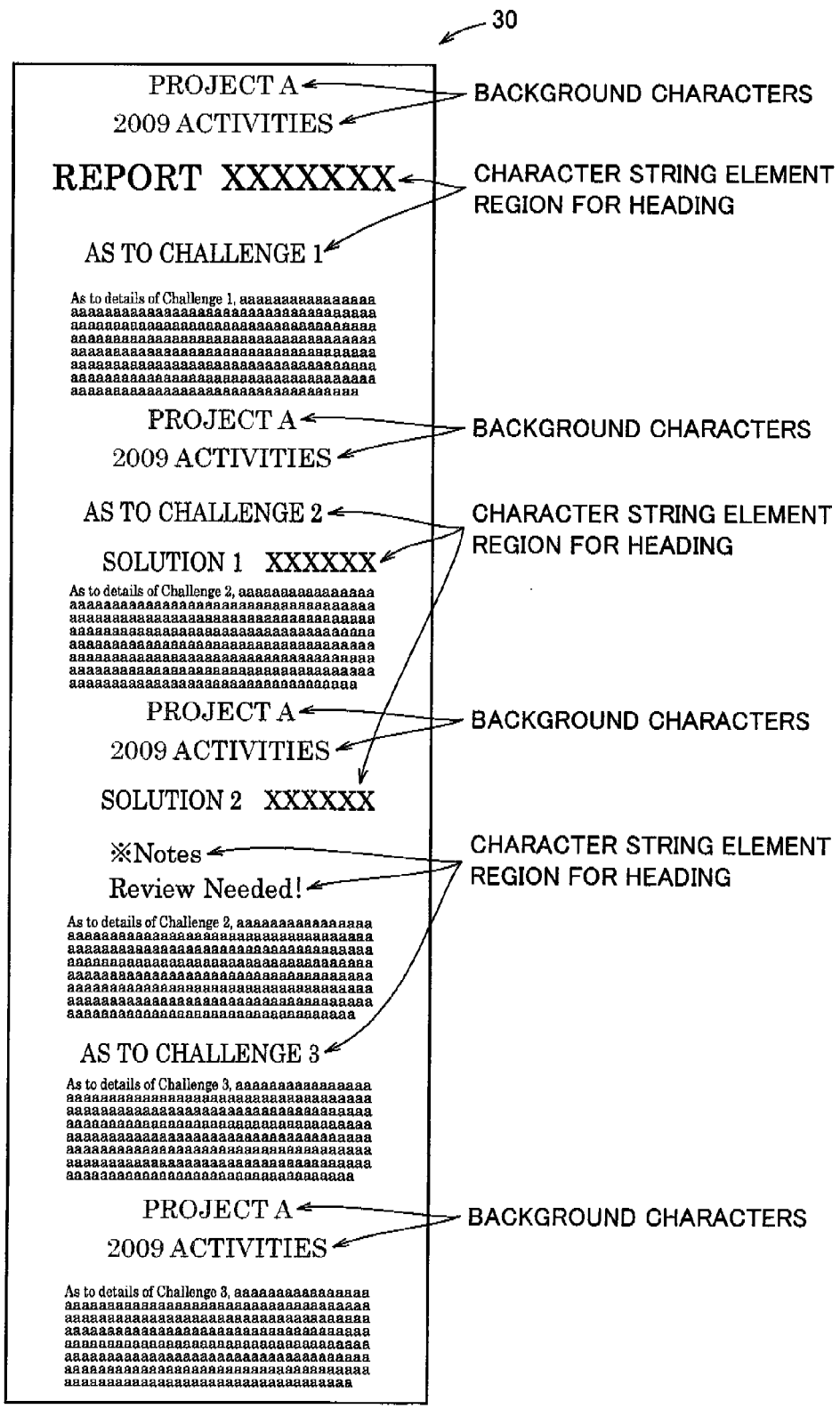
FIG. 10 is a diagram showing a sample document.

FIG. 10 is a diagram showing sample document 30 in which background characters are inserted. Sample document 30 shown in FIG. 10 is an image obtained by image reader unit 104 and stored in image buffer unit 13. In sample document 30, background characters "PROJECT A" and "2009 ACTIVITIES" are repeatedly inserted. As such background characters are inserted, a reader who sees only a part of the document can confirm a subject of the document.

Figure 11:
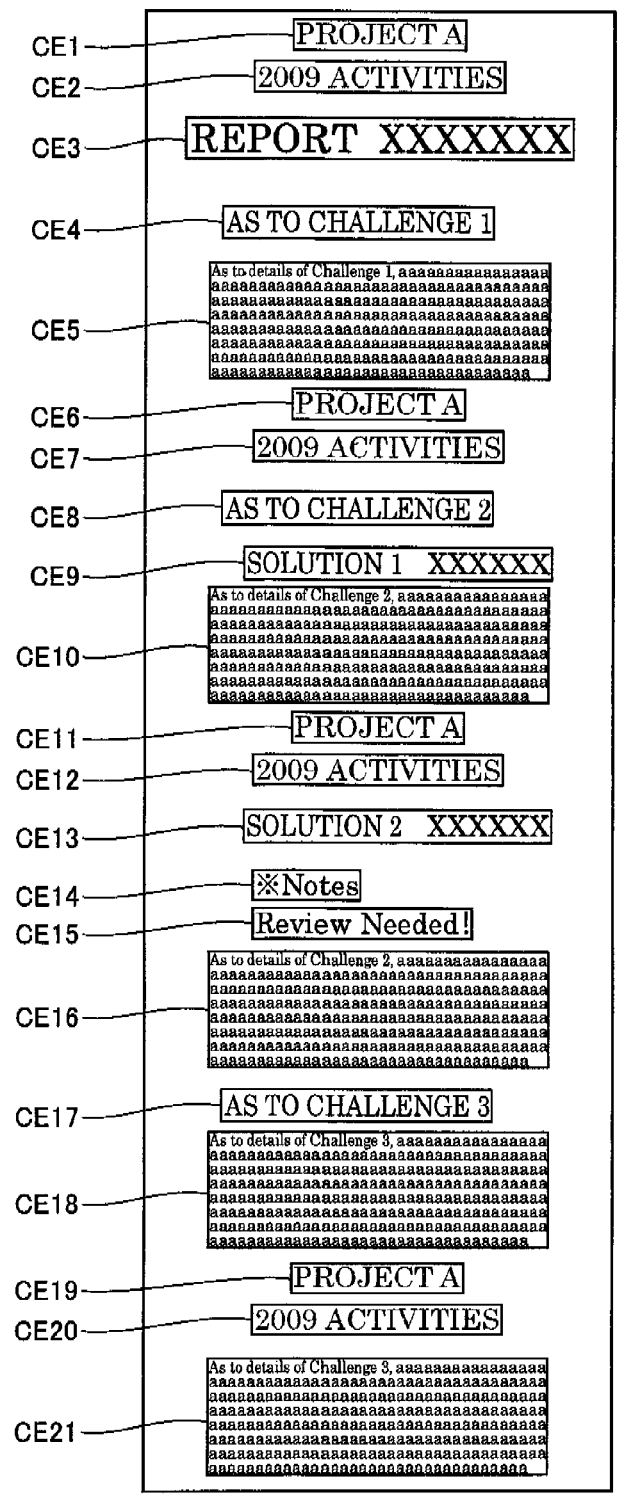
FIG. 11 is a diagram showing an example of character string element regions defined for the sample document in FIG. 10.

An example of character string element regions defined for sample document 30 in FIG. 10 is shown in FIG. 11.

Figure 12:
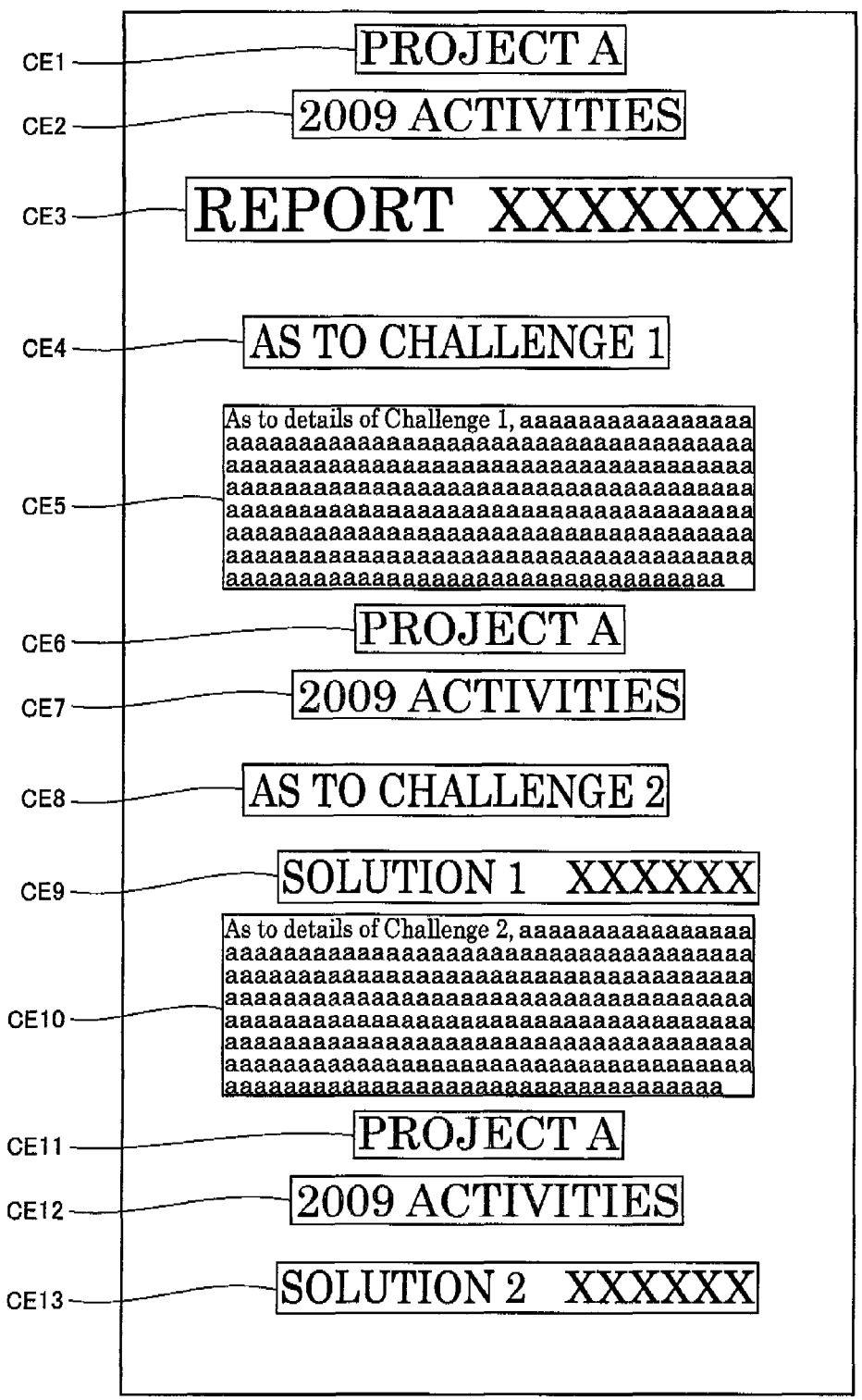
FIG. 12 is an enlarged diagram of FIG. 11.

Referring to FIG. 11, for sample document 30, character string element regions CE1 to CE21 are defined. FIG. 12 is a partially enlarged diagram of FIG. 11.

Character string element regions CE1 to CE21 shown in FIG. 11 will be used as an example to describe a subsequent process.

Referring again to FIG. 7, when the character string element determination process is completed, detection unit 161 of image analysis unit 16 classifies the character string element regions into a large region and a small region (step S10). More specifically, the area of each character string element region, the average height of characters in the whole document, and the average width of the content region in the whole document, for example, are determined. When the area of the character string element region is larger than (average height of characters in the whole document)×(average width of the content region in the whole document)×2, it is determined that the character string element region is a large region, and otherwise, it is determined that the character string element region is a small region.

Alternatively, it may be determined that a character string element region is a small region when the region is smaller than a predetermined value (one row for example). Likewise, it may be determined that a character string element region is a large or small region, from the number of characters in the region.

Figure 13:
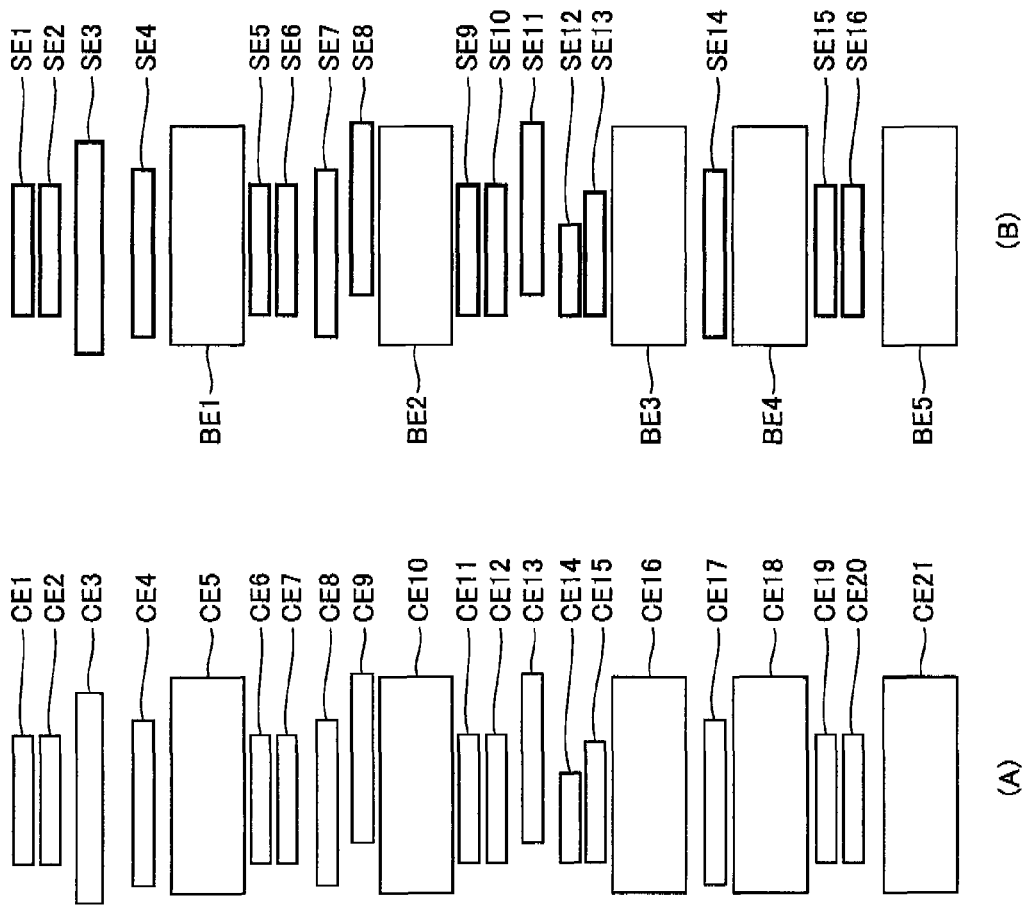
FIG. 13 is a diagram illustrating the result of classification of character string element regions of the sample document shown in FIG. 10.

FIG. 13 is a diagram illustrating the result of classification of character string element regions CE1 to CE21 in sample document 30. In FIG. 13, (A) schematically shows character string element regions CE1 to CE21 each in a rectangular form in sample document 30, and (B) illustrates the result of classification of character string element regions CE1 to CE21 shown by (A).

Referring to FIG. 13, it is determined that character string element regions CE5, CE10, CE16, CE18, and CE21 are large regions BE1 to BE5, respectively. It is also determined that remaining regions CE1 to CE4, CE6 to CE9, CE11 to CE15, CE17, CE19, and CE20 are small regions SE1 to SE16, respectively.

Small regions SE1 to SE16 are treated as candidates for heading regions (hereinafter referred to as "heading candidates"). Large regions BE1 to BE5 are treated as text regions.

Then, a process of extracting heading regions from heading candidates SE1 to SE16 which are small regions (heading extraction process) is executed (step S12).

Figure 14:
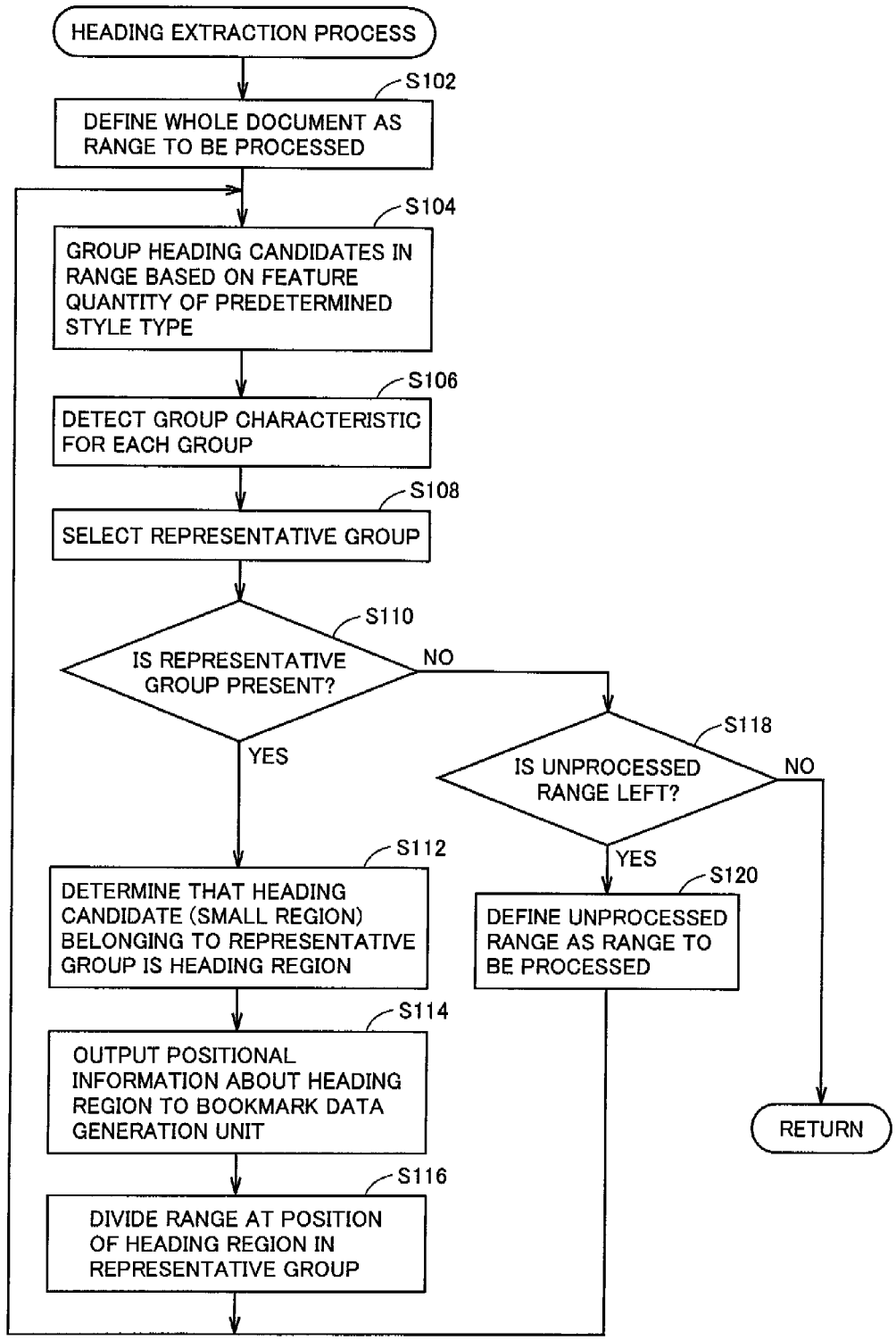
FIG. 14 is a flowchart illustrating a heading extraction process in the embodiment of the present invention.

FIG. 14 is a flowchart illustrating the heading extraction process in the present embodiment.

Referring to FIG. 14, heading extraction unit 162 first defines the whole document as a range to be processed (step S102). Specifically, the range including all character string element regions CE1 to CE21 in the document image (namely heading candidates SE1 to SE16 and text regions BE1 to BE5) is defined as a range to be processed.

Heading extraction unit 162 groups heading candidates SE1 to SE16 in the defined range into groups each constituted of heading candidates having respective feature quantities of a predetermined style type that are similar to each other (step S104). Namely, heading candidates that are identical or within a predetermined range in terms of both of the left-side starting position and the height of a row are defined as belonging to the same group.

Figure 15:
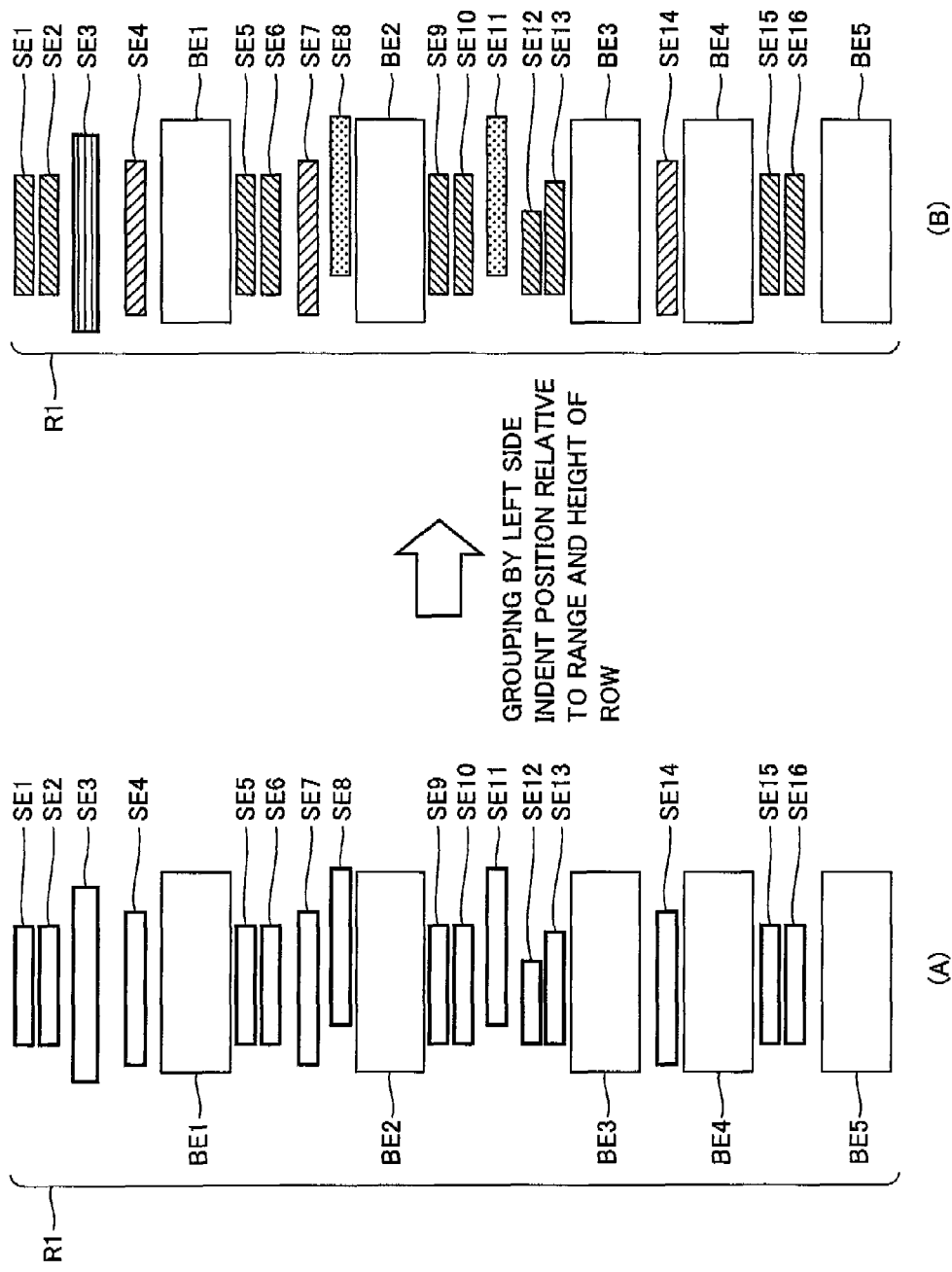
FIG. 15 is a diagram illustrating the result of grouping of heading candidates in a range that is the whole sample document shown in FIG. 10.

FIG. 15 is a diagram illustrating the result where the whole of sample document 30 is defined as a range R1 and heading candidates SE1 to SE16 in range R1 are grouped into groups. (A) of FIG. 15 illustrates an example where all character string element regions, namely range R1 including heading candidates SE1 to SE16 and text regions BE1 to BE5, are defined as a range to be processed. (B) of FIG. 15 illustrates the result of grouping of heading candidates (small regions) SE1 to SE16 in range R1 shown by (A) of FIG. 15.

Referring to (B) of FIG. 15, heading candidates SE1, SE2, SE5, SE6, SE9, SE10, SE12, SE13, SE15, and SE16 belong to "Group 1". Heading candidate SE3 belongs to "Group 2". Heading candidates SE4, SE7, and SE14 belong to "Group 3". Heading candidates SE8 and SE11 belong to "Group 4".

Heading extraction unit 162 detects group characteristics group by group (step S106), In the present embodiment, for each group, i) "left-side starting position", ii) "height of a row", and iii) "position of a heading candidate located most upstream in the group" are used as the group characteristics. Then, it is detected iv) "whether a heading candidate located upstream of all text regions in the range is included" and v) "whether a heading candidate without followed by a text region located downstream in the range is included".

After detecting these group characteristics, heading extraction unit 162 compares the results of detection following a predetermined heading extraction rule and accordingly selects a group representing the range (step S108). A heading candidate included in the selected group is confirmed as a heading region.

The heading extraction rule is applied to determine whether the results of detection of the group characteristics i) to v) indicate the likelihood that a heading candidate is a heading. Here, the rule is defined as adding or subtracting a point in advance to each result of detection. Heading extraction unit 162 determines that a group having the maximum total point is a group representing the range (representative group). Here, the condition applied to each of the group characteristics i) to v) and the point to be added or subtracted are as follows:

i) a group where "left-side starting position" is located leftmost (small indent amount): point +1;
ii) a group where "height of a row" is largest: point +1;
iii) a group where the position of the most upstream heading candidate is located uppermost in the range: point +1;
iv) a group including a heading candidate located upstream relative to all texts in the range: point +5; and
v) a group including a heading candidate without followed by a text located downstream in the range: point −10.

It should be noted that the weight of the point to be added/subtracted for each of the above-described group characteristics is not limited to the above-described one.

FIG. 16 is a table illustrating the result of determination about the heading made for Groups 1 to 4 in range R1. The information as shown in FIG. 16 is temporarily recorded on a work area of memory 102 for example in the heading extraction process.

In the table of FIG. 16, Groups 1 to 4 are described in the column direction. In the row direction, seven items namely the number of headings, i) left-side starting position, ii) height of a row, iii) most upstream position, iv) whether or not a candidate region (heading candidate) located upstream of all texts is included, and v) whether or not a candidate region (heading candidate) without followed by a text located downstream is included, and the total point are described.

For the item of the number of headings, the number of included heading candidates is recorded for each group.

In the cells under the items from i) left-side starting position to v) whether or not a candidate region (heading candidate) without followed by a text located downstream is included, the results of detection are recorded in the upper row, and the points for the results to which the above-condition (extraction rule) is applied are recorded in the lower row.

For the item of the total point, the total point is recorded for each group.

Heading extraction unit 162 determines whether a representative group is present in the range (step S110). Specifically, when there is no group having the total point of not less than a predetermined threshold (point 5 for example) in the range, it is determined that a representative group is absent in the range. In other words, when the total point of a group having the maximum total point in the range is less than the threshold, this group is excluded from the representative group. Thus, it is determined that the range does not include a representative group.

When a representative group is present in the range (YES in step S110), namely when a group having the total point of not less than 5 is present, it is determined that a heading candidate belonging to the representative group is a heading region (step S112). In range R1, Group 2 has the total point of 7. It is therefore determined that Group 2 is a representative group, and it is determined that a heading candidate in Group 2 is a heading region.

In contrast, when it is determined that a representative group is not present in the range (NO in step S110), namely there is no group having the total point of not less than 5, it is determined that the range does not include a group of a heading candidate that is likely to be a heading, and the process proceeds to step S118.

In step S118, it is determined whether or not an unprocessed range remains. When an unprocessed range is present (YES in step S118), heading extraction unit 162 defines the unprocessed range as a range to be processed (step S120). When an unprocessed range is not present (NO in step S118), the heading extraction process is ended.

In this way, a threshold is set for the total point, and a range assumed to include no group of a heading candidate that is likely to be a heading is excluded from the determination about the heading. Thus, the time for the heading extraction process can be shortened.

After step S112, heading extraction unit 162 outputs the positional information about the heading region to bookmark data generation unit 17 (step S114).

Subsequently, original range R1 is divided at the position of the heading region belonging to the representative group (step S116). Ranges generated by the division are newly defined as unprocessed ranges. One of the defined unprocessed ranges (a range located upstream for example) is defined as a range to be processed. In the present embodiment, original range R1 is divided by removing the portion between the upper side and the lower side of the heading region belonging to the representative group.

After the range is divided, the process returns to step S104 and the above-described process is repeated for the range to be processed.

Thus, for the two ranges generated by dividing range R1 shown by (A) of FIG. 15, the process in steps S104 to S116 is executed again.

FIG. 17 is a diagram illustrating the result of grouping of heading candidates SE1 to SE2 and SE4 to SE16 in two ranges R11 and R12 respectively generated by dividing range R1 shown by (A) of FIG. 15 (step S104). (A) of FIG. 17 illustrates an example where two ranges R11 and R12 are defined with respect to the position of the heading (small region SE3) belonging to the representative group (Group 2) in the original range R1. (B) of FIG. 17 illustrates the result of grouping of heading candidates (small regions) in each of ranges R11 and R12 shown by (A) of FIG. 17.

In range R11, heading candidates SE1 and SE2 belong to "Group 1_1". In range R12, heading candidates SE5, SE6, SE9, SE10, SE12, SE13, SE15, and SE16 belong to Group 1_2". Groups 3 and 4 in range R12 are the same as those in range R1.

The result of determination about the heading made for the groups in ranges R11 and R12 is illustrated in FIG. 18.

(A) of FIG. 18 shows a table illustrating the result of determination about the heading made for Group 1_1 in range R11. Referring to (B) of FIG. 17 and (A) of FIG. 18, range R11 includes Group 1_1 only, and no text region is present in range R11. Therefore, for such Group 1_1 in range R11, the determination about the heading may be ended without applying the heading extraction rule.

(B) of FIG. 18 shows a table illustrating the result of determination about the heading made for Group 1_2, Group 3, and Group 4 in range R12, In range R12, Group 3 has the maximum total point that is not less than the threshold (point 5). From range R12, therefore, Group 3 is selected as a representative group (step S108, YES in step S110). Accordingly, it is determined that heading candidates SE4, SE7, and SE14 belonging to Group 3 are heading regions, and the positional information about these regions SE4, SE7, and SE14 is output to bookmark data generation unit 17 (steps S112, S114).

Figure 19:
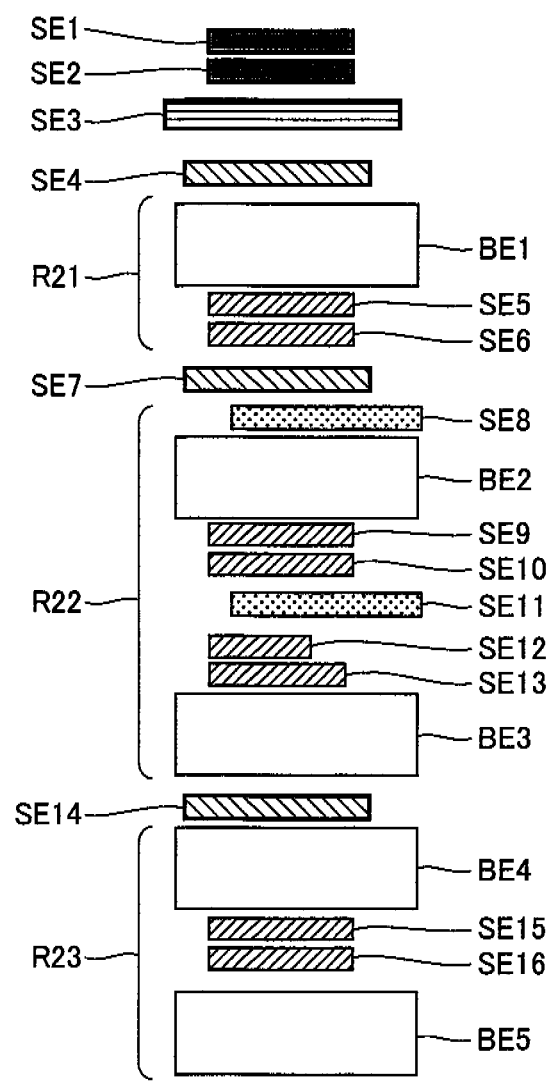
FIG. 19 is a diagram illustrating the result of grouping of heading candidates in each of ranges generated by dividing a range shown by (A) of FIG. 17.

FIG. 19 is a diagram illustrating an example where original range R12 is divided into three ranges R21, R22, and R23 with respect to respective positions of the headings (regions SE4, SE7, SE14) belonging to the representative group (Group 3) in range R12.

For ranges R21, R22, and R23 each, heading candidates are again grouped (step S104). In range R21, heading candidates SE5 and SE6 belong to "Group 1_2_1" In range R22, heading candidates SE9, SE10, SE12, and SE13 belong to "Group 1_2_2". In range R22, Group 4 is the same as that in range R1. In range R23, heading candidates SE15 and SE16 belong to "Group 1_2_3".

The result of determination about the heading for the groups in ranges R21, R22, and R23 is illustrated in FIG. 20.

In FIG. 20, (A) shows a table illustrating the result of determination about the heading made for Group 1_2_1 in range R21, (B) shows a table illustrating the result of determination about the heading made for Group 1_2_2 and Group 4 in range R22, and (C) shows a table illustrating the result of determination about the heading made for Group 1_2_3 in range R23.

Referring to (A) of FIG. 20, range R21 includes text region BE1, and text region BE1 is located most upstream in range R21. The total point of Group 1_2_1 is therefore a small value of −7. Thus, because the total point of Group 1_2_1 is less than the threshold (point 5), it is determined that range R21 does not include a representative group (NO in step S110). Accordingly, Group 1_2_1 is excluded from heading candidates.

Referring to (B) of FIG. 20, Group 4 in range R22 has the maximum total point that is not less than point 5. Therefore, from range R22, Group 4 is selected as a representative group (step S108, YES in step S110). Thus, it is determined that heading candidates SE8 and SE11 belonging to Group 4 are heading regions, and the positional information about these regions SE8 and SE11 is output to bookmark data generation unit 17 (steps S112, S114).

Referring to (C) of FIG. 20, the total point of Group 1_2_3 in range R23 is 3 that is less than the threshold (point 5). It is therefore determined that range R23 does not include a representative group (NO in step S110). As a result, Group 1_2_3 is excluded from heading candidates.

Figure 21:
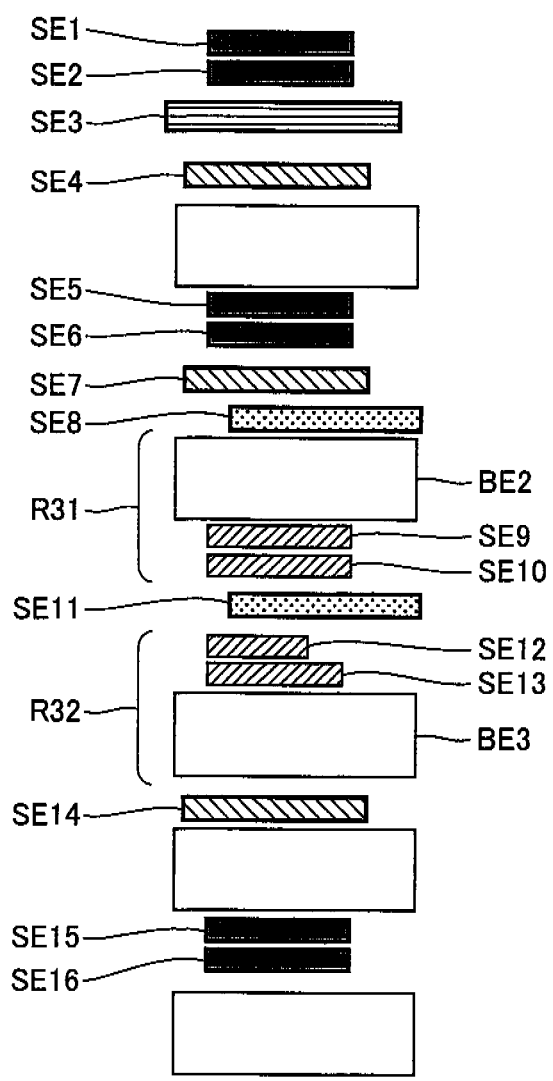
FIG. 21 is a diagram illustrating the result of grouping of heading candidates in each of ranges generated by dividing a range shown in FIG. 19.

FIG. 21 is a diagram illustrating an example where original range R22 including the representative group is divided into two ranges R31 and R32 with respect to respective positions of the headings (regions SE8, SE11) belonging to the representative group (Group 4) in range R22.

For ranges R31 and R32 each, the heading candidates are grouped again (step S104). In range R31, heading candidates SE9 and SE10 belong to "Group 1_2_3_1". In range R32, heading candidates SE12 and SE13 belong to "Group 1_2_3_2".

The result of determination about the heading made for the groups in ranges R31 and R32 is illustrated in FIG. 22.

(A) of FIG. 22 shows a table illustrating the result of determination about the heading made for Group 1_2_3_1 in range R31. (B) of FIG. 22 shows a table illustrating the result of determination about the heading made for Group 1_2_3_2 in range R32.

Referring to (A) of FIG. 22, range R31 includes text region BE2, and text region BE2 is located most upstream in range R31. Therefore, the total point of Group 1_2_3_1 is a small value of −7. Thus, because the total point of Group 1_2_3_1 is less than the threshold (point 5), it is determined that range R31 does not include a representative group (NO in step S110). As a result, Group 1_2_3_1 is excluded from heading candidates.

Referring to (B) of FIG. 22, the total point of Group 1_2_3_2 in range R32 is 8 which is not less than point 5. It is therefore determined that Group 1_2_3_2 is a representative group of range R32 (step S108, YES in step S110). Accordingly, it is determined that heading candidates SE12 and SE13 belonging to Group 1_2_3_2 are heading regions, and the positional information about these regions SE12 and SE13 is output to bookmark data generation unit 17 (steps S112, S114).

New ranges defined at the positions of the headings belonging to Group 1_2_3_2, however, include no heading candidate, and therefore invalid.

Figure 24:
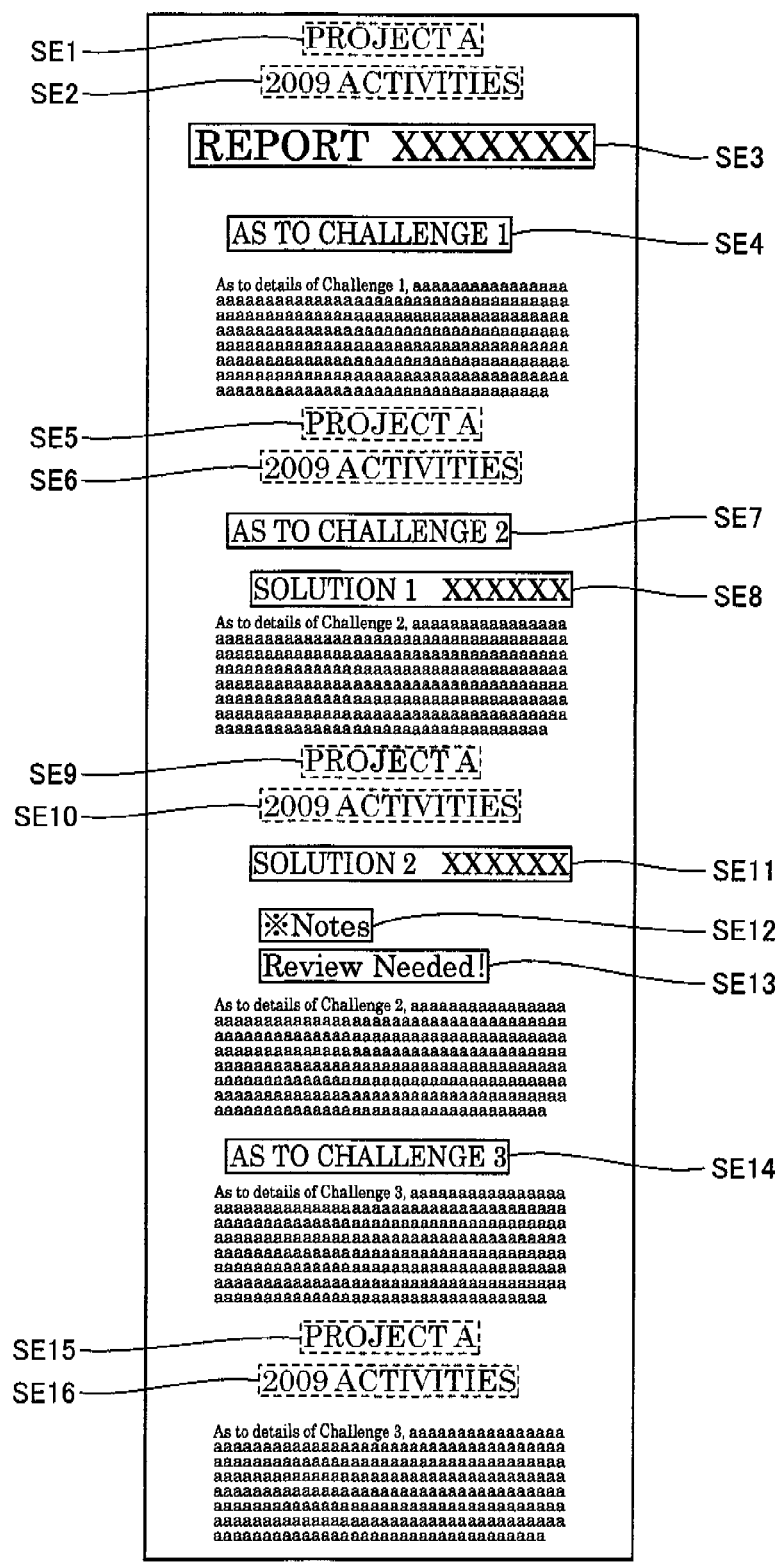
FIG. 24 is a diagram showing heading regions and non-heading regions defined for the sample document shown in FIG. 10.

FIGS. 23 and 24 show heading regions defined for sample document 30 shown in FIG. 10.

Referring to FIG. 23, among the small regions (heading candidates) SE1 to SE16 shown by (B) of FIG. 13, regions SE3, SE4, SE7, SE8, and SE11 to SE14 except for the gray regions are identified as heading regions. These regions belong to Group 2, Group 3, Group 4, and Group 1_2_3_2 extracted as groups (representative groups) of headings as a result of the above-described process.

Small regions SE1, SE2, SE5, SE6, SE9, SE10, SE15, and SE16 that are gray regions are the regions belonging to Group 1_1, Group 1_2_1, Group 1_2_3, and Group 1_2_3_1 excluded from heading candidates as a result of the above-described process.

Referring to FIG. 24, it is seen that heading candidates SE1, SE2, SE5, SE6, SE9, SE10, SE15, and SE16 that are identified as non-headings correspond to regions of background characters.

As heretofore described, according to the present embodiment, headings can be extracted appropriately, even from a document in which background characters are repeatedly inserted, by narrowing the range step by step and using feature quantities of a few style types (the left-side starting position and the height of a row) for which calculation is easy.

COMPARATIVE EXAMPLE

A description will be given of determination about the heading made for the whole document defined as one range without being narrowed for sample document 30 shown in FIG. 10, as a comparative example of the present embodiment.

For the comparative example as well, it is supposed that character string element regions (small regions) SE1 to SE16 that are heading candidates as shown by (B) of FIG. 13 are detected.

FIG. 25 is a diagram for illustrating the comparative example of the heading extraction process in the embodiment of the present invention.

In FIG. 25, for heading candidates SE1 to SE16 each, respective feature quantities of the above-described style types "left-side starting position" and "height of a row" are indicated.

Conventional grouping applies, to all of heading candidates SE1 to SE16, a rule of grouping heading candidates similar to each other in terms of the left-side starting position and the height of a row into the same group. The result of this grouping is illustrated in the rightmost column of FIG. 25. It is noted that the result of grouping in the comparative examine is the same as that for range R1 in the present embodiment.

In the comparative example, Group 1 includes both of background characters and headings. Therefore, in this state, headings cannot be extracted appropriately. Even if the rule of selecting a group is subsequently applied, it is not determined that heading candidates SE12 and SE13 are headings or it is erroneously determined that background characters are headings.

While a feature quantity of a style type that can distinguish heading candidates SE12 and SE13 from the background characters may possibly be added, selection of an effective style type depends on the document type and is therefore not easy. Further, addition of a style type used for the determination requires addition of a new process, resulting in increase in cost and processing time.

In contrast, the present embodiment appropriately defines a range to which the heading extraction rule is applied, and group characteristics in the range are used to extract headings. Therefore, MFP 1 is also adaptable to a plurality of headings of different levels.

Modifications

Depending on the level of refinement in defining the ranges which is performed in the heading extraction process, heading regions may be layered. This will be described using above-described sample document 30 as an example. It is supposed that range R1 first defined for sample document 30 is level 1, ranges R11 and R12 into which range R1 is divided are level 2, ranges R21, R22, and R23 into which range R12 is divided are level 3, and ranges R31 and R32 into which range R22 is divided is level 4. Thus, the heading regions can be layered in such a manner that heading regions of level 1 (namely heading regions extracted from range R1) belong to the highest layer, and heading regions of level 2 (namely heading regions extracted from range R12) belong to the layer subsequent to that of the heading regions of level 1, for example. In other words, the range can be divided (narrowed) to detect the relation between the headings in terms of which heading region belong to which heading region.

In the case where heading regions are layered in the above-described manner, data about the layer of each heading region may also be output to bookmark data generation unit 17. Bookmark data generation unit 17 may layer bookmark to be attached to PDF based on the layer data about each heading region.

Further, bookmark data generation unit 17 may attach, as the bookmark, only heading regions of a layer selected by a user (heading regions of layers 1 to 3 for example). Alternatively, before the heading extraction process, a user may specify the number of layers for the heading extraction, and then the heading extraction may be ended when the level of the layer specified by the user is reached. In this way, the form of use may be changed for each layer of headings to improve the convenience in creation of the bookmark.

While the above-described embodiment uses the left-side starting position and the height of a row, as style types to be used for grouping, other style types that are significant in terms of the layout may be used as well. For example, the color of characters, the background color, the central position of a region, difference between regions in justification (left justification, right justification, and center justification are identified to group them into different groups), the line width of characters, respective distances to regions immediately above and below, and the like may also be used. From these style types, a user may select those used for grouping. The user can select style types appropriate for grouping, taking into consideration differences in characteristic (attribute) between a heading and those other than the heading (such as background characters) in a document to be processed. In this way, a document of a wider variety of styles can be processed.

Further, the above-described embodiment may use other features (items) that depend on a defined range, as group characteristics used for a rule for evaluating groups.

For example, the features include to what degree the number of heading candidate regions in a group is small (a higher point is given to the smaller number of regions), the magnitude of the distance along the direction of reading from the most upstream heading candidate region and the most downstream heading candidate region in a group (a higher point is given to a larger distance), and the like. Thus, items depending on a defined range may further be used so that a document of a wider variety of styles can be processed. Accordingly, the precision in heading extraction can further be improved.

Moreover, the present embodiment supposes that the contents of a document proceed from the top toward the bottom. In the case where the contents of a document proceed between the top and the bottom like a multi-column layout or the like, whether a region of interest is located upstream or downstream along the direction in which the contents proceed may be determined so that such a document can be processed as well.

In addition, the image processing method performed by the image processing apparatus in the present embodiment may be provided in the form of a program. Such a program can also be provided in the form of a program product recorded on an optical medium such as CD-ROM (Compact Disc-ROM) or a computer-readable non-transitory recording medium such as memory card. Further, the program can also be provided by being downloaded through a network.

Furthermore, the program according to the present invention may be executed by calling a necessary module in a predetermined arrangement at a predetermined timing, among program modules provided as a part of an operating system (OS) of a computer. In this case, the program itself does not include the module and the process is executed in cooperation with the OS. Such a program without module may also be included in the program according to the present embodiment.

In addition, the program according to the present embodiment may be incorporated in another program and then provided. In this case as well, the program itself does not include a module included in the other program, and the process is executed in cooperation with the other program. Such a program incorporated in another program may also be included in the program according to the present embodiment.

The program product as provided is installed in a program storage such as hard disk and then executed. It should be noted that the program product includes a program itself and a storage medium where the program is stored.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing method performed by an image processing apparatus for extracting a heading region from an image of a document, comprising:
    storing said image by said image processing apparatus; and
    analyzing said image by said image processing apparatus, said analyzing said image comprising:
        detecting candidates for said heading region, from a plurality of character string element regions in said image;
        defining a range including a plurality of said character string element regions as a range to be processed;
        grouping into groups said candidates within said range to be processed, based on position of the candidates and size of a row within the candidates;
        quantitatively determining, for each of said groups included in said range to be processed, an extent to which each of said groups corresponds to said heading region, based on position of the candidates within each of said groups and size of a row within the candidates within each of said groups;
        selecting, from said groups included in said range to be processed, a group that corresponds most to said heading based on said extent, as a representative group;
        determining that said candidate belonging to said representative group is said heading region;
        dividing said range to be processed, at a position of said heading region; and
        newly defining each of portions generated by dividing said range to be processed, as said range to be processed.

2. A non-transitory computer-readable medium encoded with a computer program for executing the method according to claim 1.

3. An image processing apparatus for extracting a heading region from an image of a document, comprising:
    a storage unit configured to store said image; and
    an analysis unit configured to analyze said image, said analysis unit being configured to:
        detect candidates for said heading region, from a plurality of character string element regions in said image;
        define a range including a plurality of said character string element regions as a range to be processed;
        group into groups said candidates within said range to be processed, based on position of the candidates and size of a row within the candidates;
        quantitatively determine, for each of said groups included in said range to be processed, an extent to which each of said groups corresponds to said heading region, based on position of the candidates within each of said groups and size of a row within the candidates within each of said groups;
        select, from said groups included in said range to be processed, a group that corresponds most to said heading based on said extent, as a representative group;
        determine that said candidate belonging to said representative group is said heading region;
        divide sub-ranges other than said candidate belonging to said representative group in said defined range, at a position of said candidate belonging to said representative group; and
        newly define each of the divided sub-ranges other than said candidate belonging to said representative group, as said range to be processed.

4. The image processing apparatus according to claim 3, wherein said position of the candidates and said size of a row within the candidates includes a feature that depends on said defined range.

5. The image processing apparatus according to claim 4, wherein said analysis unit further uses, as said position of the candidates and size of a row within the candidates, a quantity corresponding to a feature in terms of style of a character string for said groups each.

6. The image processing apparatus according to claim 5, wherein said feature that depends on said defined range includes at least one of an uppermost position of said candidates in said defined range, and a relation in terms of order with respect to a text region that is a region other than said candidates in said defined range.

7. The image processing apparatus according to claim 6, wherein said analysis unit classifies a plurality of said character string element regions into a small region and a large region, detects said small region as said candidate, and detects said large region as said text region.

8. The image processing apparatus according to claim 3, wherein said analysis unit divides said defined range at a position preceding or following said candidate belonging to said representative group.

9. The image processing apparatus according to claim 8, wherein said analysis unit further excludes, from said representative group, a group that does not satisfy a predetermined criterion when an extraction rule is applied to a result of detection of said characteristic.

10. The image processing apparatus according to claim 9, wherein said analysis unit further excludes from said candidates, said candidate in a range including only the group excluded from said representative group.

11. The image processing apparatus according to claim 10, wherein said analysis unit makes a determination, for each of defined ranges generated by dividing said defined range, about whether a group of said candidates included in the range includes only the group excluded from said representative group, and said analysis unit newly defines a range in which a heading candidate for which the determination has not been made is present, as said range to be processed.

12. The image processing apparatus according to claim 3, wherein said analysis unit layers said candidates used for dividing said defined range, based on a relation in terms of layers generated by the division.

\* \* \* \* \*